(12) United States Patent
Yamaguchi et al.

(10) Patent No.: US 6,426,785 B2
(45) Date of Patent: Jul. 30, 2002

(54) REFLECTIVE LIQUID CRYSTAL DISPLAY DEVICE

(75) Inventors: Hisanori Yamaguchi; Shingo Fujita; Hiroaki Mizuno; Tetsu Ogawa, all of Ishikawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/907,197

(22) Filed: Jul. 17, 2001

Related U.S. Application Data

(62) Division of application No. 08/984,260, filed on Dec. 3, 1997, now Pat. No. 6,300,990.

(30) Foreign Application Priority Data

Dec. 5, 1996 (JP) .............................................. 8-324944

(51) Int. Cl.$^7$ ......................... G02F 1/1335; C09K 19/02
(52) U.S. Cl. ........................ 349/101; 349/99; 349/117; 349/119; 349/113; 349/181
(58) Field of Search ................................ 349/112, 117, 349/119, 106, 113, 120, 76, 96, 181, 101, 99

(56) References Cited

U.S. PATENT DOCUMENTS

| | | | |
|---|---|---|---|
| 4,019,808 A | 4/1977 | Scheffer | ...................... 349/97 |
| 4,088,400 A | 5/1978 | Assouline et al. | ............. 353/20 |

(List continued on next page.)

FOREIGN PATENT DOCUMENTS

| | | |
|---|---|---|
| JP | 3-223715 | 10/1991 |
| JP | 3-228016 | 10/1991 |
| JP | 6-175125 | 6/1994 |
| JP | 6-235931 | 8/1994 |
| JP | 6-301006 | 10/1994 |
| JP | 6-308481 | 11/1994 |
| JP | 7-84252 | 3/1995 |
| JP | 7-104272 | 4/1995 |
| JP | 7-146469 | 6/1995 |
| JP | 8-201802 | 8/1996 |
| JP | 9-113893 | 5/1997 |
| JP | 10-154817 | 6/1998 |

*Primary Examiner*—William L. Sikes
*Assistant Examiner*—Tarifur R. Chowdhury
(74) *Attorney, Agent, or Firm*—Merchant & Gould PC

(57) ABSTRACT

A reflective liquid crystal display device of the present invention has the following construction. A transparent electrode is provided via color filter layer on a transparent substrate positioned at the upper side of the device. A metallic reflective electrode is provided on a substrate positioned at the lower side of the device. An alignment layer is provided on the transparent electrode and on the metallic reflective electrode respectively. The transparent substrate positioned at the upper side and the substrate positioned at the lower side are arranged parallel to each other with alignment films provided on the transparent electrode and on the metallic reflective electrode facing each other. A liquid crystal layer is provided between the alignment films. A scattering film is provided on a surface of the transparent substrate positioned at the upper side opposite to the surface where the transparent electrode is provided. A polymer film and a polarization film are provided in that sequential order on the scattering film. The present reflective liquid crystal display device can express a black and white display in achromatic color having bright white display and with high contrast, and has low visual angle dependency and excellent optical characteristics.

22 Claims, 8 Drawing Sheets

U.S. PATENT DOCUMENTS

| | | | |
|---|---|---|---|
| 4,660,936 A | 4/1987 | Nosker | 349/67 |
| 4,973,137 A | 11/1990 | Kozaki | 349/119 |
| 4,984,872 A | 1/1991 | Vick | 359/15 |
| 5,089,906 A * | 2/1992 | Ohnishi et al. | 349/119 |
| 5,132,830 A | 7/1992 | Fukutani et al. | 349/106 |
| 5,175,638 A | 12/1992 | Kanemoto et al. | 349/121 |
| 5,408,344 A | 4/1995 | Takiguchi et al. | 349/57 |
| 5,528,400 A | 6/1996 | Arakawa | 349/117 |
| 5,548,426 A | 8/1996 | Miyashita et al. | 349/117 |
| 5,585,950 A | 12/1996 | Nishino et al. | 349/118 |
| 5,587,821 A | 12/1996 | Nakanishi et al. | 349/118 |
| 5,619,356 A | 4/1997 | Kozo et al. | 349/99 |
| 5,629,784 A | 5/1997 | Abileah et al. | 349/112 |
| 5,684,551 A | 11/1997 | Nakamura et al. | 349/99 |
| 5,686,979 A | 11/1997 | Weber et al. | 349/96 |
| 5,699,137 A * | 12/1997 | Kishimoto | 349/102 |
| 5,793,455 A | 8/1998 | Nakamura | 349/96 |
| 5,796,455 A | 8/1998 | Mizobata et al. | 349/112 |
| 5,953,089 A | 9/1999 | Hiji et al. | 349/112 |
| 6,011,605 A | 1/2000 | Mizuno et al. | 349/113 |
| 6,055,033 A * | 4/2000 | Yamaguchi et al. | 349/101 |
| 6,115,095 A | 9/2000 | Suzuki et al. | 349/141 |
| 6,144,430 A | 11/2000 | Kuo | 349/113 |
| 6,144,432 A * | 11/2000 | Hatanaka et al. | 349/113 |

* cited by examiner

REFLECTIVE LIQUID CRYSTAL DISPLAY DEVICE

This application is a divisional of application Ser. No. 08/984,260, filed Dec. 3, 1997 now U.S. Pat. No. 6,300,990, which application(s) are incorporated herein by reference.

FIELD OF THE INVENTION

The present invention relates to a reflective liquid crystal display device having brightness and high contrast.

BACKGROUND OF THE INVENTION

A liquid crystal display device is thin and light, therefore, has been widely used as a display for a personal digital assistant. The liquid crystal device does not emit light itself and is a device to express the display by changing the transmissivity and can be driven with several volts of effective voltage. Accordingly, when the liquid crystal display device is used as a reflective one which comprises a reflector provided at the back side of the liquid crystal cell and expresses the display by reflecting the outside light, a display device with an extremely low consumption of electricity can be provided.

A conventional reflective color liquid crystal display device comprises a liquid crystal cell having a color filter and a pair of polarization films by which the liquid crystal cell is sandwiched. In this case, the color filter is provided on one of the substrates of the liquid crystal cell and a transparent electrode is formed on the color filter provided on the substrate. A voltage is applied to the liquid crystal cell to change the alignment of liquid crystal molecule. Accordingly, the transmissivity of each color filter is changed so as to express a color display.

The transmissivity of one polarization film is 45% at most, as a whole. In this case, the transmissivity of the polarization component parallel to the adsorption axis of the polarization film is about 0% and the transmissivity of the polarization component perpendicular to the adsorption axis of the polarization film is about 90%. Accordingly, in a reflective liquid crystal display device comprising two polarization films, when the outside light is incident and reflected by a reflector and goes outside, the light passes through the polarization film four times. As a result, when the transmissivity of the polarization component perpendicular to the adsorption aids of the polarization film is 50% and the light is not adsorbed by the color filter, the reflectance of the outside light is obtained by the following formula.

$$0.9^4 \times 50\% = 32.8\%$$

Accordingly, when the color filter of the conventional reflective color liquid crystal display device is removed and used as a black and white panel in the same way, the reflectance reaches 33% at most.

In order to brighten the light display, several reflective liquid crystal display devices comprising one polarization film provided on the upper side of a liquid crystal cell that is sandwiched by the polarization film and the reflector have already been proposed. (refer to Japanese Laid-Open Patent Publication No.7-146469 and No.7-84252). In these proposed reflective liquid crystal display devices, the light passes through the polarization film only twice. When the light is not adsorbed by the color filter, the reflectance of the outside light is obtained by the following formula.

$$0.9^2 \times 50\% = 40.5\%$$

Therefore, these proposed reflective liquid crystal display devices can be expected to increase the reflectance by at most about 23.5% in comparison with that of the liquid crystal display device comprising two polarization films.

A reflective color liquid crystal display device in which color display is expressed by using the birefringence of a twist orientation nematic liquid crystal and polarization film, without using a color filter, has been disclosed in Japanese Laid-Open Patent Publication No.6-308481. A color liquid crystal display device in which birefringence of liquid crystal and phase difference film is used has been disclosed in Japanese Laid-Open Patent Publication No.6-175125 and No.6-301006.

In the reflective liquid crystal display device which expresses color display with color filter and comprises one polarization film to increase the reflectance and to obtain the brightness, however, it is difficult to express a black and white display in achromatic color, especially it is difficult to express a black display in achromatic color with low reflectance. Further, in this reflective liquid crystal display device, the dependency of the reflectance and brightness on the incident direction of the outside light and the observer's viewing direction, that is, the visual angle dependency of the optical characteristics, is high. When the visual angle dependency of the reflective liquid crystal display device comprising one polarization film is high, the visual angle is narrow and the following problem also occurs. That is, when black brightness is changed greatly with respect to the change of incident direction of the outside light, the optical characteristic of the reflective liquid crystal display device is deteriorated greatly since it is more difficult for the reflective liquid crystal display device to control the incident direction of the outside light in comparison with the transmissive liquid crystal display device.

In the reflective color liquid crystal display in which a color display is expressed by using birefringence of a twist alignment nematic liquid crystal and polarization film, without using a color filter or the color liquid crystal display in which birefringence of liquid crystal and phase difference film is used, since the color filter is not present, the efficient reflectance to obtain the practical brightness can be ensured even if two polarization films are used. However, in the above-mentioned color liquid crystal display devices, since the color display is expressed by using birefringence, it is difficult to express multi-grade and multi-color display such as 16 grade 4096 color display. Further, the range of color purity and color reproduction is also narrow.

In the reflective liquid crystal display device with black and white mode comprising two polarization films, a white display with high reflectance can't be obtained and the display becomes dark.

SUMMARY OF THE INVENTION

In order to solve the above-mentioned problems in the prior art, it is an object of the present invention to provide a reflective liquid crystal display device having low visual angle dependency and preferable optical characteristics, and that can express a black and white display in achromatic color having bright white and a high contrast display.

To accomplish the above-mentioned object, a reflective liquid crystal display device according to a first embodiment of the present invention comprises a polarization film, at least one scattering film, a transparent substrate, a transparent electrode, an alignment layer, a liquid crystal layer, an alignment layer, a metallic reflective electrode and a substrate, which are arranged in that order. According to the first embodiment of the reflective liquid crystal display device, since the scattering film is provided, the collective efficiency of the outside light can be increased to obtain the bright display and in addition, the visual angle dependency can be reduced. Further, since the scattering film is provided dose to the liquid crystal cell an image blur caused by the parallax effect can be prevented.

In the first embodiment of the reflective liquid crystal display device according to the present invention, it is preferable that at least one polymer film is provided between the polarization film and the scattering film. In this case, it is preferable that the polymer film is one selected from a group consisting of polycarbonate, polyalylate and polysulfane.

Further, in the first embodiment of the reflective liquid crystal display device according to the present invention, it is preferable that at least one polymer film is provided between the scattering film and the transparent substrate. In this case, it is preferable that the polymer film is one selected from a group consisting of polycarbonate, polyalylate and polysulfane.

In the first embodiment of the reflective liquid crystal display device according to the present invention, it is preferable that the metallic reflective electrode comprises aluminum or silver and is of the specular reflection type. According to this preferable example, the characteristic is not deteriorated by disordering of the alignment of liquid crystal and the visual angle dependency becomes low.

In the first embodiment of the reflective liquid crystal display device according to the present invention, it is preferable that the scattering film is a forward scattering film. In this case, it is preferable that a scattering range of the forward scattering film is asymmetric with respect to the normal direction of the film. According to this preferable example, outside light can be collected effectively, and the reflectance characteristic and the contrast characteristic of the front surface become excellent. Further, in this case, it is preferable that a plurality of layered forward scattering films are used and the projection direction of a bisector direction of the angle indicating the scattering range of each forward scattering film to the surface of the film is different. According to this preferable example, natural visual angle characteristics can be obtained at many directions. Further, in this case, it is preferable that two, three or four forward scattering films, which are layered, are used and the projection directions of a bisector direction of the angles indicating the scattering range of each forward scattering film to the surface of the film are at a right angle or anti-parallel to each other.

In the first embodiment of the reflective liquid crystal display device according to the present invention, it is preferable that a color filter layer is provided between the transparent substrate and the transparent electrode.

A reflective liquid crystal display device according to a second embodiment of the present invention comprises a transparent substrate positioned at the upper side, a substrate positioned at the lower side, a liquid crystal cell, two polymer films and a polarization film. A transparent electrode and an alignment layer are provided in that sequential order on the inner side of the transparent electrode positioned at the upper side. A metallic reflective electrode and an alignment layer are provided in that sequential order on the inner side of the substrate positioned at the lower side. The liquid crystal cell, in which nematic liquid crystal as a liquid is filled, is provided between the transparent substrate positioned at the upper side and the substrate positioned at the lower side. Two polymer films are provided outside of the transparent substrate positioned at the upper side of the liquid crystal cell. The polarization film is provided outside of the polymer films. The twist angle of the nematic liquid crystal is selected between 220° and 260°. The product of the birefringence of the nematic liquid crystal $\Delta n_{LC}$ and the thickness of the liquid crystal layer $d_{LC}$, $\Delta n_{LC} \cdot d_{LC,}$ is set to be between 0.6 µm and 1.2 µm. One of these polymer films positioned closer to the liquid crystal cell is designated as 1 and the other one is designated as 2. When an extraordinary index of refraction of the inside of each polymer film is designated as $n_x(i)$ (i=1,2), an ordinary index of refraction of the inside of each polymer film is designated as $n_y(i)$ (i=1,2), and a thickness of each polymer film is designated as $d_{Film}(i)$ (i=1,2), the retardation of each polymer film, designated as $R_{Film}(i)$ is obtained by following formula : $R_{Film}(i)=(n_x(i)-n_y(i))\cdot d_{Film}(i)$ (i=1,2). The birefringence difference, $\Delta(R)= (R_{Film}(1)+R_{Film}(2))-\Delta n_{LC} \cdot d_{LC,}$ which is obtained by using the retardation of the polymer film ($R_{Film}(i)=(n_x(i))-n_y(i))\cdot d_{Film}(i)$ (i=1,2)) and $\Delta n_{LC} \cdot d_{LC,}$ is between –0.1 µm and –0.2 µm. When a reflective liquid crystal display device is seen from the side of the transparent substrate positioned at the upper side, the twist direction of the liquid crystal is designated as the positive direction of rotation, an angle is measured using the horizontal direction as a standard. When the angle of the alignment direction of the liquid crystal molecule on the transparent substrate positioned at the upper side is designated as $\phi_{LC}$ the angle of the direction of retardation axis (the direction of extraordinary index of refraction) of the polymer film provided on the side of the liquid crystal cell is designated as $\phi_{F1}$, the angle of the direction of retardation axis (the direction of extraordinary index of refraction) of the polymer film provided on the side of the polarization film is designated as $\phi_{F2}$, the angle of the direction of the adsorption axis of the polarization film is designated as $\phi_P$, $\phi_{F1}-\phi_{LC}$ satisfies 90°±20°, $\phi_{F2}-\phi_{F1}$ satisfies 45°±20° and $\phi_P-\phi_{F2}$ satisfies –45°±20°. The second embodiment of the reflective liquid crystal display device can express a black display with low reflectance in achromatic color and a white display with high reflectance in achromatic color, that is, a high contrast display. In addition, since the twist angle of the nematic liquid crystal is selected between 220° and 260°, the excellent characteristic can be obtained even if the liquid crystal display device is driven with a duty ratio of less than 1/200. Furthermore, since $\phi_P-\phi_{F2}$ satisfies –45°±20°, the birefringence can be utilized with almost maximum efficiency and the utilization rate of light can be increased.

In the second embodiment of the reflective liquid crystal display device according to the present invention, it is preferable that the twist angle of the nematic liquid crystal is selected between 240° and 260°, and $\Delta n_{LC} \cdot d_{LC}$ is determined to be between 0.8 µm and 1.1 µm. According to this preferable example, the excellent characteristic can be obtained even if the liquid crystal display device is driven with a duty ratio of less than 1/240.

In the second embodiment of the reflective liquid crystal display device according to the present invention, it is preferable that $R_{Film}(1)$ is 0.3 µm±0.1 µm and $R_{Film}(2)$ is 0.5 µm±0.1 µm. According to this preferable example, the reflectance of black, when an off-voltage is applied, can be decreased.

In the second embodiment of the reflective liquid crystal display device according to the present invention, it is preferable that the polymer film is one selected from a group consisting of polycarbonate, polyalylate and polysulfane.

In the second embodiment of the reflective liquid crystal display device, when one of two polymer films positioned closer to the liquid crystal cell is designated as 1 and the other one is designated as 2, an extraordinary index of refraction of the inside of each polymer film is designated as $n_x(i)$ (i=1,2), an ordinary index of refraction of the inside of each polymer film is designated as $n_y(i)$ (i=1,2), and an index of refraction of the perpendicular direction to each polymer film is designated as $n_z(i)$ (i=1,2), the Z coefficient, $Q_z$ is obtained by following formula.

$$Q_z(i)=(n_x(i)-n_z(i))/(n_x(i)-n_y(i))$$

In the above formula, it is preferable that $Q_z(2)$ is between 0.0 and 1.0. According to this preferable example, the reflective liquid crystal display device having low visual angle dependency can be obtained. In this case, it is preferable that $Q_z(2)$ is between 0.3 and 0.7. Furthermore, in this case, it is preferable that $Q_z(1)$ is between 0.3 and 0.7.

In the second embodiment of the reflective liquid crystal display device according to the present invention, it is preferable that the metallic reflective electrode comprises aluminum or silver and is of the specular reflection type.

In the second embodiment of the reflective liquid crystal display device according to the present invention, it is preferable that at least one scattering film is provided between a polymer film and a liquid crystal cell. In this case, it is preferable that the scattering film is a forward scattering film. In this case, it is preferable that a scattering range of the forward scattering film is asymmetric with respect to the normal direction of the film. Further, in this case, it is preferable that a plurality of layered forward scattering films are used and a projection direction of a bisector direction of the angle indicating the scattering range of each forward scattering film to the surface of the film is different. Further, in this case, it is preferable that two, three or four forward scattering films, which are layered, are used and the projection directions of a bisector direction of the angles indicating the scattering range of each forward scattering film to the surface of the film are at a right angle or anti-parallel to each other.

In the second embodiment of the reflective liquid crystal display device according to the present invention, it is preferable that at least one scattering film is provided between a polarization film and a polymer film. In this case, it is preferable that the scattering film is a forward scattering film. In this case, it is preferable that a scattering range of the forward scattering film is asymmetric with respect to the normal direction of the film. Further, in this case, it is preferable that a plurality of layered forward scattering films are used and a projection direction of a bisector direction of the angle indicating the scattering range of each forward scattering film to the surface of the film is different. Further, in this case, it is preferable that two, three or four forward scattering films, which are layered, are used and the projection directions of a bisector direction of the angles indicating the scattering range of each forward scattering film to the surface of the film are at a right angle or anti-parallel to each other.

In the second embodiment of the reflective liquid crystal display device according to the present invention, it is preferable that the metallic reflective electrode is a diffusion reflective type or one having a scattering film which is layered on a specular metallic reflective electrode. According to this preferable example, the reflective liquid crystal display device having a natural change of visual angle characteristic can be obtained.

In the second embodiment of the reflective liquid crystal display device according to the present invention, it is preferable that a transparent substrate is used as a substrate positioned at the lower side, a transparent electrode is provided on the substrate positioned at the lower side instead of metallic reflective electrode and a diffusion reflector comprising aluminum or silver is provided on the outside of the substrate provided at the lower side. According to this preferable example, the reflective liquid crystal display device having a natural change of visual angle characteristic can be obtained. Further, in this case, it is preferable that air is present between the diffusion reflector and the liquid crystal cell.

In the second embodiment of the reflective liquid crystal display device according to the present invention, a color filter layer is provided between a transparent substrate provided at the upper side and a color filter layer.

A reflective liquid crystal display device according to a third embodiment of the present invention comprises a transparent substrate positioned at the upper side, a substrate positioned at the lower side, a liquid crystal cell, two polymer films and a polarization film. A transparent electrode and an alignment layer are provided in that sequential order on the inner side of the transparent electrode positioned at the upper side. A metallic reflective electrode and an alignment layer are provided in that sequential order on the inner side of the substrate positioned at the lower side. The liquid crystal cell, in which nematic liquid crystal as a liquid is filled, is provided between the transparent substrate positioned at the upper side and the substrate positioned at the lower side. Two polymer films are provided outside of the transparent substrate positioned at the upper side of the liquid crystal cell. The polarization film is provided outside of the polymer films. The twist angle of the nematic liquid crystal is selected between 220° and 260°. The product of the birefringence of the nematic liquid crystal $\Delta n_{LC}$ and the thickness of the liquid crystal layer $d_{LC}$, $\Delta n_{LC} \cdot d_{LC}$ is set to be between 0.6 μm and 1.2 μm. One of these polymer films positioned closer to the liquid crystal cell is designated as 1 and the other one is designated as 2. When an extraordinary index of refraction of the inside of each polymer film is designated as $n_x(i)$ (i=1,2), an ordinary index of refraction of the inside of each polymer film is designated as $n_y(i)$ (i=1,2), and a thickness of each polymer film is designated as $d_{Film}(i)$ (i=1,2), the retardation of each polymer film, designated as $R_{Film}(i)$ is obtained by the following formula: $R_{Film}(i)=(n_x(i)-n_y(i)) \cdot d_{Film}(i)$ (i=1,2). The birefringence difference, $\Delta(R)=(R_{Film}(1)+R_{Film}(2))-\Delta n_{LC} \cdot d_{LC}$, which is obtained by using the retardation of the polymer film ($R_{Film}(i)=(n_x(i)-n_y(i)) \cdot d_{Film}(i)$ (i=1,2)) and $\Delta n_{LC} \cdot d_{LC}$, is between 0.4 μm and 0.5 μm. When a reflective liquid crystal display device is seen from the side of the transparent substrate positioned at the upper side, the twist direction of the liquid crystal is designated as the positive direction of rotation, and an angle is measured using the horizontal direction as a standard. When the angle of the alignment direction of the liquid crystal molecule on the transparent substrate positioned at the upper side is designated as $\phi_{LC}$, the angle of the direction of retardation axis (the direction of the extraordinary index of refraction) of the polymer film provided on the side of the liquid crystal cell is designated as $\phi_{F1}$, the angle of the direction of the retardation axis (the direction of extraordinary index of refraction) of the polymer film provided on the side of the polarization film is designated as $\phi_{F2}$, the angle of the direction of the adsorption axis of the polarization film is designated as $\phi_P$, $\phi_{F1}-\phi_{LC}$ satisfies 70°±20°, $\phi_{F2}-\phi_{F1}$ satisfies 60°±20° and $\phi_P-\phi_{F2}$ satisfies −20°±20°. The third embodiment of the reflective liquid crystal display device can express a black display with low reflectance in achromatic color and a white display with high reflectance in achromatic color, that is, a high contrast display. In addition, since the twist angle of the nematic liquid crystal is selected between 220° and 260°, the excellent characteristic can be obtained even if the liquid crystal display device is driven with a duty ratio of less than 1/200. Furthermore, since $\phi_P-\phi_{F2}$ satisfies $-20°\pm20°$, the birefringence can be utilized with almost maximum efficiency and the utilization rate of light can be increased.

In the third embodiment of the reflective liquid crystal display device according to the present invention, it is preferable that the twist angle of the nematic liquid crystal is selected between 240° and 260°, and $\Delta n_{LC} \cdot d_{LC}$ is determined to be between 0.8 μm and 1.1 μm.

In the third embodiment of the reflective liquid crystal display device according to the present invention, it is preferable that $R_{Film}(1)$ is 0.75 μm±0.1 μm and $R_{Film}(2)$ is 0.6 μm±0.1 μm. According to this preferable example, the reflectance of black when an off-voltage is applied can be decreased.

In the third embodiment of the reflective liquid crystal display device according to the present invention, it is preferable that the polymer film is one selected from the group consisting of polycarbonate, polyalylate and polysulfane.

In the third embodiment of the reflective liquid crystal display device, when one of two polymer films positioned closer to the liquid crystal cell is designated as 1 and the other one is designated as 2, an extraordinary index of refraction of the inside of each polymer film is designated as $n_x(i)$ (i=1,2), an ordinary index of refraction of the inside of each polymer film is designated as $n_y(i)$ (i=1,2), and an index of refraction of the perpendicular direction to each polymer film is designated as $n_z(i)$ (i=1,2), the Z coefficient $Q_z$ is obtained by following formula.

$$Q_z(i)=(n_x(i)-n_z(i))/(n_x(i)-n_y(i))$$

In the above formula, it is preferable that $Q_z(2)$ is between 0.0 and 1.0. According to this preferable example, the reflective liquid crystal display device having a low visual angle dependency can be obtained. In this case, it is preferable that $Q_z(2)$ is between 0.3 and 0.7. Furthermore, in this case, it is preferable that $Q_z(1)$ is between 0.3 and 0.7.

In the third embodiment of the reflective liquid crystal display device according to the present invention, it is preferable that the metallic reflective electrode comprises aluminum or silver and is of the specular reflection type.

In the third embodiment of the reflective liquid crystal display device according to the present invention, it is preferable that at least one scattering film is provided between a polymer film and a liquid crystal cell In this case, it is preferable that the scattering film is a forward scattering film. In this case, it is preferable that a scattering range of the forward scattering film is asymmetric with respect to the normal direction of the film. Further, in this case, it is preferable that a plurality of layered forward scattering films are used and the projection directions of a bisector direction of the angles indicating the scattering range of each forward scattering film to the surface of the film is different. Further, in this case, it is preferable that two, three or four forward scattering films, which are layered, are used and the projection directions of a bisector direction of the angles indicating the scattering range of each forward scattering film to the surface of the film are at a right angle or anti-parallel to each other.

In the third embodiment of the reflective liquid crystal display device according to the present invention, it is preferable that at least one scattering film is provided between a polarization film and a polymer film. In this case, it is preferable that the scattering film is a forward scattering film. In this case, it is preferable that a scattering range of the forward scattering film is asymmetric with respect to the normal direction of the film. Further, in this case, it is preferable that a plurality of layered forward scattering films are used and a projection direction of a bisector direction of the angle indicating the scattering range of each forward scattering film to the surface of the film is different. Further, in this case, it is preferable that two, three or four forward scattering films, which are layered, are used and the projection directions of a bisector direction of the angles indicating the scattering range of each forward scattering film to the surface of the film are at a right angle or is anti-parallel to each other.

In the third embodiment of the reflective liquid crystal display device according to the present invention, it is preferable that the metallic reflective electrode is a diffusion reflective type or one having a scattering film which is layered on a specular metallic reflective electrode.

In the third embodiment of the reflective liquid crystal display device according to the present invention, it is preferable that a transparent substrate is used as a substrate positioned at the lower side, a transparent electrode is provided on the substrate positioned at the lower side instead of metallic reflective electrode and a diffusion reflector comprising aluminum or silver is provided on the outside of the substrate provided at the lower side. Further, in this case, it is preferable that air is present between the diffusion reflector and the liquid crystal cell.

In the third embodiment of the reflective liquid crystal display device according to the present invention, a color filter layer is provided between a transparent substrate provided at the upper side and a transparent electrode.

A reflective liquid crystal display device according to a fourth embodiment of the present invention comprises a transparent substrate positioned at the upper side, a substrate positioned at the lower side, a liquid crystal cell, two polymer films and a polarization film. A transparent electrode and an alignment layer are provided in that sequential order on the inner side of the transparent electrode positioned at the upper side. A metallic reflective electrode and an alignment layer are provided in that sequential order on the inner side of the substrate positioned at the lower side. The liquid crystal cell, in which nematic liquid crystal as a liquid is filled, is provided between the transparent substrate positioned at the upper side and the substrate positioned at the lower side. Two polymer films are provided outside of the transparent substrate positioned at the upper side of the liquid crystal cell. The polarization film is provided outside of the polymer films. The twist angle of the nematic liquid crystal is selected between 220° and 260°. The product of the birefringence of the nematic liquid crystal $\Delta n_{LC}$ and the thickness of the liquid crystal layer $d_{LC}$, $\Delta n_{LC} \cdot d_{LC}$ is determined between 0.6 μm and 1.2 μm. One of these polymer films positioned closer to the liquid crystal cell is designated as 1 and the other one is designated as 2. When an extraordinary index of refraction of the inside of each polymer film is designated as $n_x(i)$ (i=1,2), an ordinary index of refraction of the inside of each polymer film is designated as $n_y(i)$ (i=1,2), and a thickness of each polymer film is designated as $d_{Film}(i)$ (i=1,2), the retardation of each polymer film, designated as $R_{Film}(i)$ is obtained by the following formula: $R_{Film}(i)=(n_x(i)-n_y(i))\cdot d_{Film}(i)$ (i=1,2). The birefringence difference, $\Delta(R)=(R_{Film}(1)+R_{Film}(2))-\Delta n_{LC} \cdot d_{LC}$, which is obtained by using the retardation of the polymer film ($R_{Film}(i)=(n_x(i)-n_y(i))\cdot d_{Film}(i)$ (i=1,2)) and $\Delta n_{LC} \cdot d_{LC}$, is between 0.15 μm and 0.3 μm. When a reflective liquid crystal display device is seen from the side of the transparent substrate positioned at the upper side, the twist direction of the liquid crystal is designated as the positive direction of rotation, an angle is measured using the horizontal direction as a standard. When the angle of the alignment direction of the liquid crystal molecule on the transparent substrate positioned at the upper side is designated as $\phi_{LC}$, the angle of the direction of retardation axis (the direction of extraordinary index of refraction) of the polymer film which is provided on the side of the liquid crystal cell is designated as $\phi_{F1}$, the angle of the direction of retardation axis (the direction of extraordinary index of refraction) of the polymer film which is provided on the side of the polarization film is designated as $\phi_{F2}$, the angle of the direction of the adsorption axis of the polarization film is designated as $\phi_P$, $\phi_{F1}-\phi_{LC}$ satisfies $145°\pm20°$, $\phi_{F2}-\phi_{F1}$ satisfies $-120°\pm20°$ and $\phi_P-\phi_{F2}$ satisfies $\pm45°\pm20°$. The fourth embodiment of the reflective liquid crystal display device can express a black display with low reflectance in achromatic color and a white display with high reflectance in achromatic color, that is, a high contrast display. In addition, since the twist angle of the nematic liquid crystal is selected between 220° and 260°, the excellent characteristic can be obtained even if the liquid crystal display device is driven with a duty ratio of less than 1/200. Furthermore, since $\phi_P-\phi_{F2}$ satisfies $\pm45°\pm20°$, the birefringence can be utilized with almost maximum efficiency and the utilization rate of light can be increased.

In the fourth embodiment of the reflective liquid crystal display device according to the present invention, it is preferable that the twist angle of the nematic liquid crystal is selected between 240° and 260°, and $\Delta n_{LC}\cdot d_{LC}$ is determined to be between 0.8 μm and 1.1 μm.

In the fourth embodiment of the reflective liquid crystal display device according to the present invention, it is preferable that $R_{Film}(1)$ is 0.3 μm±10.1 μm and $R_{Film}(2)$ is 0.75 μm±0.1 μm. According to this preferable example, the reflectance of black when an off-voltage is applied can be decreased.

In the fourth embodiment of the reflective liquid crystal display device according to the present invention, it is preferable that the polymer film is one selected from a group consisting of polycarbonate, polyalylate and polysulfane.

In the fourth embodiment of the reflective liquid crystal display device, when one of two polymer films positioned closer to the liquid crystal cell is designated as 1 and the other one is designated as 2, an extraordinary index of refraction of the inside of each polymer film is designated as $n_x(i)$ (i=1,2), an ordinary index of refraction of the inside of each polymer film is designated as $n_y(i)$ (i=1,2), and an index of refraction of the perpendicular direction to each polymer film is designated as $n_z(i)$ (i=1,2), the Z coefficient, $Q_z$ is obtained by the following formula.

$$Q_z(i)=(n_x(i)-n_z(i))/(n_x(i)-n_y(i))$$

In the above formula, it is preferable that $Q_z(2)$ is between 0.0 and 1.0. According to this preferable example, the reflective liquid crystal display device having a low visual angle dependency can be obtained. In this case, it is preferable that $Q_z(2)$ is between 0.3 and 0.7. Furthermore, in this case, it is preferable that $Q_z(1)$ is between 0.3 and 0.7.

In the fourth embodiment of the reflective liquid crystal display device according to the present invention, it is preferable that the metallic reflective electrode comprises aluminum or silver and is of the specular reflection type.

In the fourth embodiment of the reflective liquid crystal display device according to the present invention, it is preferable that at least one scattering film is provided between a polymer film and a liquid crystal cell. In this case, it is preferable that the scattering film is a forward scattering film. In this case, it is preferable that a scattering range of the forward scattering film is asymmetric with respect to the normal direction of the film. Further, in this case, it is preferable that a plurality of layered forward scattering films are used and a projection direction of a bisector direction of angle indicating the scattering range of each forward scattering film to the surface of the film is different. Further, in this case, it is preferable that two, three or four forward scattering films, which are layered, are used and a projection direction of a bisector direction of the angle indicating the scattering range of each forward scattering film to the surface of the film are at a right angle or anti-parallel to each other.

In the fourth embodiment of the reflective liquid crystal display device according to the present invention, it is preferable that at least one scattering film is provided between a polarization film and a polymer film. In this case, it is preferable that the scattering film is forward scattering film. In this case, it is preferable that a scattering range of the forward scattering film is asymmetric with respect to the normal direction of the film. Further, in this case, it is preferable that a plurality of layered forward scattering films are used and the projection directions of a bisector direction of the angles indicating the scattering range of each forward scattering film to the surface of the film is different. Further, in this case, it is preferable that two, three or four forward scattering films, which are layered, are used and the projection directions of a bisector direction of the angles indicating the scattering range of each forward scattering film to the surface of the film are at a right angle or anti-parallel to each other.

In the fourth embodiment of the reflective liquid crystal display device according to the present invention, it is preferable that the metallic reflective electrode is a diffusion reflective type or one having a scattering film which is layered on a specular metallic reflective electrode.

In the fourth embodiment of the reflective liquid crystal display device according to the present invention, it is preferable that a transparent substrate is used as a substrate positioned at the lower side, a transparent electrode is provided on the substrate positioned at the lower side instead of metallic reflective electrode and a diffusion reflector comprising aluminum or silver is provided on the outside of the substrate provided at the lower side. Further, in this case, it is preferable that air is present between the diffusion reflector and the liquid crystal cell.

In the fourth embodiment of the reflective liquid crystal display device according to the present invention, a color filter layer is provided between a transparent substrate provided at the upper side and a transparent electrode.

A reflective liquid crystal display device according to a fifth embodiment of the present invention comprises a transparent substrate positioned at the upper side, a substrate positioned at the lower side, a liquid crystal cell, two polymer films and a polarization film. A transparent electrode and an alignment layer are provided in that sequential order on the inner side of the transparent electrode positioned at the upper side. A metallic reflective electrode and an alignment layer are provided in that sequential order on the inner side of the substrate positioned at the lower side. The liquid crystal cell, in which nematic liquid crystal as a liquid is filled, is provided between the transparent substrate positioned at the upper side and the substrate positioned at the lower side. Two polymer films are provided outside of the transparent substrate positioned at the upper side of the liquid crystal cell. The polarization film is provided outside of the polymer films. The twist angle of the nematic liquid crystal is selected between 220° and 260°. The product of the birefringence of the nematic liquid crystal $\Delta n_{LC}$ and the thickness of the liquid crystal layer $d_{LC}$, $\Delta n_{LC} \cdot d_{LC}$, is set to be between 0.6 μm and 1.2 μm. One of these polymer films positioned closer to the liquid crystal cell is designated as 1 and the other one is designated as 2. When an extraordinary index of refraction of the inside of each polymer film is designated as $n_x(i)$ (i=1,2), an ordinary index of refraction of the inside of each polymer film is designated as $n_y(i)$ (i=1,2), and a thickness of each polymer film is designated as $d_{Film}(i)$ (i=1,2), the retardation of each polymer film, designated as $R_{Film}(i)$, is obtained by the following formula:

$$R_{Film}(i)=(n_x(i)-n_y(i)) \cdot d_{Film}(i) \ (i=1,2)$$

The birefringence difference, $\Delta(R)=(R_{Film}(1)+R_{Film}(2))-\Delta n_{LC} \cdot d_{LC}$, which is obtained by using the retardation of the polymer film $(R_{Film}(i)=(n_x(i)-n_y(i)) \cdot d_{Film}(i) \ (i=1,2))$ and $\Delta n_{LC} \cdot d_{LC}$, is between 0.05 μm and 0.15 μm. When a reflective liquid crystal display device is seen from the side of the transparent substrate positioned at the upper side, the twist direction of the liquid crystal is designated as the positive direction of rotation, and an angle is measured using the horizontal direction as a standard. When the angle of the alignment direction of the liquid crystal molecule on the transparent substrate positioned at the upper side is designated as $\phi_{LC}$, the angle of the direction of retardation axis (the direction of extraordinary index of refraction) of the polymer film which is provided on the side of the liquid crystal cell is designated as $\phi_{F1}$, the angle of the direction of retardation axis (the direction of extraordinary index of refraction) of the polymer film which is provided on the side of the polarization film is designated as $\phi_{F2}$, the angle of the direction of the adsorption axis of the polarization film is designated as $\phi_P$, $\phi_{F1}-\phi_{LC}$ satisfies 90°±20°, $\phi_{F2}-\phi_{F1}$ satisfies −45°±20° and $\phi_P-\phi_{F2}$ satisfies ±60°±20°. The fifth embodiment of the reflective liquid crystal display device can express a black display with low reflectance in achromatic color and a white display with high reflectance in achromatic color, that is, a high contrast display. In addition, since the twist angle of the nematic liquid crystal is selected between 220° and 260°, the excellent characteristic can be obtained even if the liquid crystal display device is driven with a duty ratio of less than 1/200. Furthermore, since $\phi_P-\phi_{F2}$ satisfies ±60°±20°, the birefringence can be utilized with almost maximum efficiency and utilization rate of light can be increased.

In the fifth embodiment of the reflective liquid crystal display device according to the present invention, it is preferable that the twist angle of the nematic liquid crystal is selected between 240° and 260° and $\Delta n_{LC} \cdot d_{LC}$ is determined to be between 0.8 μm and 1.1 μm.

In the fifth embodiment of the reflective liquid crystal display device according to the present invention, it is preferable that $R_{Film}(1)$ is 0.6 μm±0.1 μm and $R_{Film}(2)$ is 0.5 μm±0.1 μm. According to this preferable example, the reflectance of black when an off-voltage is applied can be decreased.

In the fifth embodiment of the reflective liquid crystal display device according to the present invention, it is preferable that the polymer film is one selected from a group consisting of polycarbenate, polyalylate and polysulfane.

In the fifth embodiment of the reflective liquid crystal display device, when one of two polymer films positioned closer to the liquid crystal cell is designated as 1 and the other one is designated as 2, an extraordinary index of refraction of the inside of each polymer film is designated as $n_x(i)$ (i=1,2), an ordinary index of refraction of the inside of each polymer film is designated as $n_y(i)$ (i=1,2), and an index of refraction of the perpendicular direction to each polymer film is designated as $n_z(i)$ (i=1,2), the Z coefficient, $Q_z$ is obtained by the following formula.

$$Q_z(i)=(n_x(i)-n_z(i))/(n_x(i)-n_y(i))$$

In the above formula, it is preferable that $Q_z(2)$ is between 0.0 and 1.0. According to this preferable example, the reflective liquid crystal display device having low visual angle dependency can be obtained. In this case, it is preferable that $Q_z(2)$ is between 0.3 and 0.7. Furthermore, in this case, it is preferable that $Q_z(1)$ is between 0.3 and 0.7.

In the fifth embodiment of the reflective liquid crystal display device according to the present invention, it is preferable that the metallic reflective electrode comprises aluminum or silver and is of the specular reflection type.

In the fifth embodiment of the reflective liquid crystal display device according to the present invention, it is preferable that at least one scattering film is provided between a polymer film and a liquid crystal cell. In this case, it is preferable that the scattering film is a forward scattering film. In this case, it is preferable that a scattering range of the forward scattering film is asymmetric with respect to the normal direction of the film. Further, in this case, it is preferable that a plurality of layered forward scattering films are used and a projection direction of a bisector direction of the angle indicating the scattering range of each forward scattering film to the surface of the film is different. Further, in this case, it is preferable that two, three or four forward scattering films, which are layered, are used and the projection directions of a bisector direction of the angles indicating the scattering range of each forward scattering film to the surface of the film are at a right angle or is anti-parallel to each other.

In the fifth embodiment of the reflective liquid crystal display device according to the present invention, it is preferable that at least one scattering film is provided between a polarization film and a polymer film. In this case, it is preferable that the scattering film is a forward scattering film. In this case, it is preferable that a scattering range of the forward scattering film is asymmetric with respect to the normal direction of the film. Further, in this case, it is preferable that a plurality of layered forward scattering films are used and a projection direction of a bisector direction of the angle indicating the scattering range of each forward scattering film to the surface of the film is different. Further, in this case, it is preferable that two, three or four forward scattering films, which are layered, are used and the projection directions of a bisector direction of the angles indicating the scattering range of each forward scattering film to the surface of the film are at a right angle or is anti-parallel to each other.

In the fifth embodiment of the reflective liquid crystal display device according to the present invention, it is preferable that the metallic reflective electrode is a diffusion reflective type or one having a scattering film which is layered on a specular metallic reflective electrode.

In the fifth embodiment of the reflective liquid crystal display device according to the present invention, it is preferable that a transparent substrate is used as a substrate positioned at the lower side, a transparent electrode is provided on the substrate positioned at the lower side instead of metallic reflective electrode and a diffusion reflector comprising aluminum or silver is provided on the outside of the substrate provided at the lower side. Further, in this case, it is preferable that air is present between the diffusion reflector and the liquid crystal cell.

In the fifth embodiment of the reflective liquid crystal display device according to the present invention, a color filter layer is provided between a transparent substrate provided at the upper side and a transparent electrode.

A reflective liquid crystal display device according to a sixth embodiment of the present invention comprises a transparent substrate positioned at the upper side, a substrate positioned at the lower side, a liquid crystal cell, two polymer films and a polarization film. A transparent electrode and an alignment layer are provided in that sequential order on the inner side of the transparent electrode positioned at the upper side. A metallic reflective electrode and an alignment layer are provided in that sequential order on the inner side of the substrate positioned at the lower side. The liquid crystal cell, in which nematic liquid crystal as a liquid is filled, is provided between the transparent substrate positioned at the upper side and the substrate positioned at the lower side. Two polymer films are provided outside of the transparent substrate positioned at the upper side of the liquid crystal cell. The polarization film is provided outside of the polymer films. The twist angle of the nematic liquid crystal is selected between 220° and 260°. The product of the birefringence of the nematic liquid crystal $\Delta n_{LC}$ and the thickness of the liquid crystal layer $d_{LC}$, $\Delta n_{LC} \cdot d_{LC}$ is set to be between 0.6 µm and 1.2 µm. One of these polymer films positioned closer to the liquid crystal cell is designated as 1 and the other one is designated as 2. When an extraordinary index of refraction of the inside of each polymer film is designated as $n_x(i)$ (i=1,2), an ordinary index of refraction of the inside of each polymer film is designated as $n_y(i)$ (i=1,2), and a thickness of each polymer film is designated as $d_{Film}(i)$ (i=1,2), the retardation of each polymer film, designated as $R_{Film}(i)$, is obtained by the following formula: $R_{Film}(i)=(n_x(i)-n_y(i)) \cdot d_{Film}(i)$ (i=1,2). The birefringence difference, $\Delta(R)=(R_{Film}(1)+R_{Film}(2))-\Delta n_{LC} \cdot d_{LC}$, which is obtained by using the retardation of the polymer film ($R_{Film}(i)=(n_x(i)-n_y(i)) \cdot d_{Film}(i)$ (i=1,2)) and $\Delta n_{LC} \cdot d_{LC}$, is between 0.3 µm and 0.4 µm. When a reflective liquid crystal display device is seen from the side of the transparent substrate positioned at the upper side, the twist direction of the liquid crystal is designated as the positive direction of rotation, and an angle is measured using the horizontal direction as a standard. When the angle of the alignment direction of the liquid crystal molecule on the transparent substrate positioned at the upper side is designated as $\phi_{LC}$, the angle of the direction of retardation axis (the direction of extraordinary index of refraction) of the polymer film which is provided on the side of the liquid crystal cell is designated as $\phi_{F1}$ the angle of the direction of retardation axis (the direction of extraordinary index of refraction) of the polymer film which is provided on the side of the polarization film is designated as $\phi_{F2}$, the angle of the direction of the adsorption axis of the polarization film is designated as $\phi_P$, $\phi_{F1}-\phi_{LC}$ satisfies 110°±20°, $\phi_{F2}-\phi_{F1}$ satisfies −60°±20° and $\phi_P-\phi_{F2}$ satisfies (±45°−20°) ±20°. The sixth embodiment of the reflective liquid crystal display device can express a black display with low reflectance in achromatic color and a white display with high reflectance in achromatic color, that is, a high contrast display. In addition, since the twist angle of the nematic liquid crystal is selected between 220° and 260°, the excellent characteristic can be obtained even if the liquid crystal display device is driven with a duty ratio of less than 1/200. Furthermore, since $\phi_P-\phi_{F2}$ satisfies (±45−20°) ±20°, the birefringence can be utilized with almost maximum efficiency and the utilization rate of light can be increased.

In the sixth embodiment of the reflective liquid crystal display device according to the present invention, it is preferable that the twist angle of the nematic liquid crystal is selected between 240° and 260°, and $\Delta n_{LC} \cdot d_{LC}$ is determined between 0.8 µm and 1.1 µm.

In the sixth embodiment of the reflective liquid crystal display device according to the present invention, it is preferable that $R_{Film}(1)$ is 0.5 µm±0.1 µm and $R_{Film}(2)$ is 0.7 µm±0.1 µm. According to this preferable example, the reflectance of black when an off-voltage is applied can be decreased.

In the sixth embodiment of the reflective liquid crystal display device according to the present invention, it is preferable that the polymer film is one selected from a group consisting of polycarbonate, polyalylate and polysulfane.

In the sixth embodiment of the reflective liquid crystal display device, when one of two polymer films positioned closer to the liquid crystal cell is designated as 1 and the other one is designated as 2, an extraordinary index of refraction of the inside of each polymer film is designated as $n_x(i)$ (i=1,2), an ordinary index of refraction of the inside of each polymer film is designated as $n_y(i)$ (i=1,2), and an index of refraction of the perpendicular direction to each polymer film is designated as $n_z(i)$ (i=1,2), the Z coefficient, $Q_z$ is obtained by the following formula.

$$Q_z(i)=(n_x(i)-n_z(i))/(n_x(i)-n_y(i))$$

In the above formula, it is preferable that $Q_z(2)$ is between 0.0 and 1.0. According to this preferable example, the reflective liquid crystal display device having a low visual angle dependency can be obtained. In this case, it is preferable that $Q_z(2)$ is between 0.3 and 0.7. Furthermore, in this case, it is preferable that $Q_z(1)$ is between 0.3 and 0.7.

In the sixth embodiment of the reflective liquid crystal display device according to the present invention, it is preferable that the metallic reflective electrode comprises aluminum or silver and is of the specular reflection type.

In the sixth embodiment of the reflective liquid crystal display device according to the present invention, it is preferable that at least one scattering film is provided between a polymer film and a liquid crystal cell. In this case, it is preferable that the scattering film is forward scattering film. In this case, it is preferable that a scattering range of the forward scattering film is asymmetric with respect to the normal direction of the film. Further, in this case, it is preferable that a plurality of layered forward scattering films are used and a projection direction of a bisector direction of angle indicating the scattering range of each forward scattering film to the surface of the film is different. Further, in this case, it is preferable that two, three or four forward scattering films, which are layered, are used and the projection directions of a bisector direction of the angle indicating the scattering range of each forward scattering film to the surface of the film are at a right angle or anti-parallel to each other.

In the sixth embodiment of the reflective liquid crystal display device according to the present invention, it is preferable that at least one scattering film is provided between a polarization film and a polymer film. In this case, it is preferable that the scattering film is forward scattering film. In this case, it is preferable that a scattering range of the forward scattering film is asymmetric with respect to the normal direction of the film. Further, in this case, it is preferable that a plurality of layered forward scattering films are used and a projection direction of a bisector direction of the angle indicating the scattering range of each forward scattering film to the surface of the film is different. Further, in this case, it is preferable that two, three or four forward scattering films, which are layered, are used and the projection directions of a bisector direction of the angles indicating the scattering range of each forward scattering film to the surface of the film are at a right angle or anti-parallel to each other.

In the sixth embodiment of the reflective liquid crystal display device according to the present invention, it is preferable that the metallic reflective electrode is a diffusion reflective type or one having a scattering film which is layered on a specular metallic reflective electrode.

In the sixth embodiment of the reflective liquid crystal display device according to the present invention, it is preferable that a transparent substrate is used as a substrate positioned at the lower side, a transparent electrode is provided on the substrate positioned at the lower side instead of a metallic reflective electrode and a diffusion reflector comprising aluminum or silver is provided on the outside of the substrate provided at the lower side. Further, in this case, it is preferable that an air presents between the diffusion reflector and the liquid crystal cell.

In the sixth embodiment of the reflective liquid crystal display device according to the present invention, a color filter layer is provided between a transparent substrate provided at the upper side and a transparent electrode.

DETAILED DESCRIPTION OF THE INVENTION

Figure 1:
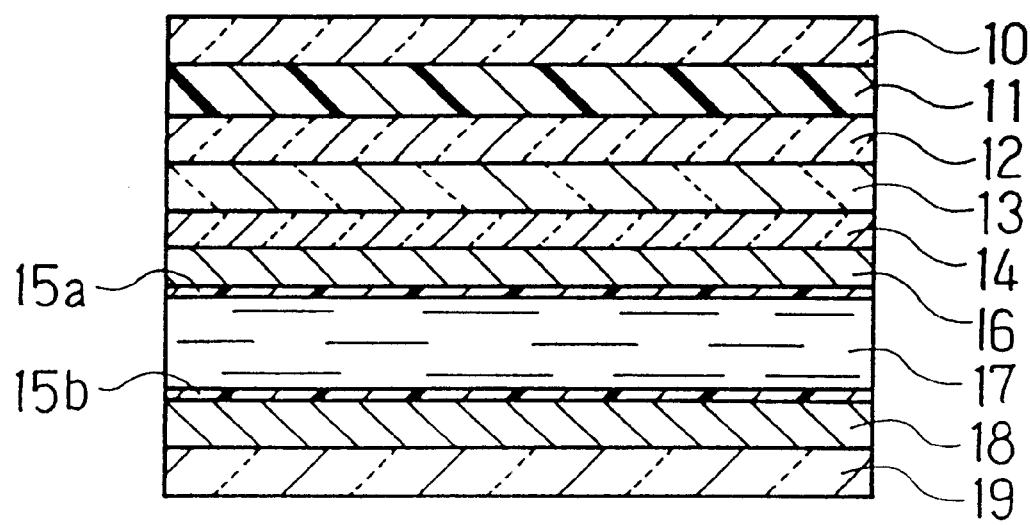
FIG. 1 is a sectional view showing a reflective liquid crystal display device in a first embodiment of the present invention.

Hereinafter, the details of the present invention will be described referring to the drawings.
(A First Embodiment)

FIG. 1 is a sectional view showing a reflective liquid crystal display device of a first embodiment of the present invention. As shown in FIG. 1, a transparent electrode 16 is provided via a color filter layer 14 on a transparent substrate 13 which is positioned at the upper side of the device. A metallic reflective electrode 18 is provided on a substrate 19 positioned at the lower side of the device. An alignment layer 15a is provided on the transparent electrode 16, and an alignment layer 15b is provided on the metallic reflective electrode 18 respectively. The a transparent substrate 13 positioned at the upper side and the substrate 19 positioned at the lower side are arranged parallel to each other with the alignment layers 15a and 15b facing each other. A liquid crystal layer 17 is provided between the alignment layers 15a and 15b. A scattering film 12 is provided on a surface of the transparent substrate 13 positioned at the upper side opposite to the surface where the transparent electrode 16 is provided. A polymer film 11 and a polarization film 10 are provided in that sequential order on the scattering film 12.

Next, a method for manufacturing the reflective liquid crystal display device having the above-mentioned construction will be explained.

A non-alkali glass substrate was used as the transparent substrate 13 positioned at the upper side and the substrate 19 positioned at the lower side. Pigment dispersion color filter layer 14 with stripe-array of red, green and blue was provided by photolithography on the transparent substrate 13. A transparent electrode 16 composed of oxide of indium and tin as a picture element electrode was provided on the surface of the color filter layer 14. Each picture element electrode is driven actively by thin film transistor (TFT) provided on the transparent substrate 13 positioned at the upper side. A specular reflective metallic reflective electrode 18 was provided on the substrate 19 positioned at the lower side by depositing titanium film having a thickness of 300 nm and aluminum film having a thickness of 200 nm in that sequential order.

5 wt % polyimide solution (the solvent is γ-butyrolactone) was printed on a transparent electrode 16 and a metallic reflective electrode 18. Then the polyimide solution was hardened at 200° C. and alignment treatment was carried out by the rotation rubbing method using rayon cloth to obtain the rubbing directions that are anti-parallel to each other. Accordingly, alignment layers 15a and 15b were provided on the transparent electrode 16 and the metallic reflective electrode 18 respectively.

Next, a thermo-setting seal resin containing 1.0 wt % of lass fiber having a diameter of 5.7 $\mu$m was printed on the periphery of the top surface of the transparent substrate 13 positioned at the upper side and resin beads having a diameter of 4.5 $\mu$m were spread on the substrate 19 positioned at the lower side at a ratio of 200 pieces/mm$^2$. The transparent substrate 13 positioned at the upper side and the substrate 19 positioned at the lower side were adhered together, and then the thermosetting seal resin was hardened at 150° C. to manufacture a cell container. In this case, the cell container has a filling portion for filling liquid crystal material. Next, air in the cell container was evacuated while the liquid crystal material was deaerated. Then, fluorine-containing ester based nematic liquid crystal having a birefringence $\Delta n_{LC}$=0.09 was filled in the cell container. Then, the filling portion of the cell container was sealed with ultraviolet ray hardening resin, and the ultraviolet ray hardening resin was hardened by irradiation with ultraviolet ray to manufacture a liquid crystal cell.

A forward scattering film with a scattering range between 0° and 50° measured from the normal line of the film was adhered to the surface of the transparent substrate 13 as a scattering film, opposite to the surface where the transparent electrode 16 was provided, so as to match the projection direction of a bisector direction of the angle indicating the scattering range of the forward scattering film to the surface of the film with the rubbing direction at the side of the transparent substrate 13 positioned at the upper side.

Next, a polycarbonate having a retardation of 385 nm and the Z coefficient, $Q_z$ of 0.5 was adhered to the scattering film 12 as a polymer film 11 in which the retardation axis direction is at a right angle to the rubbing direction at the side of the transparent substrate 13 positioned at the upper side.

Finally, a neutral gray polarization film, to which anti-glare (AG) treatment and anti-reflection treatment was applied, was adhered to the polymer film 11 as a polarization film 10 in which the angle between the adsorption axis direction and the rubbing direction at the side of the transparent substrate 13 positioned at the upper side is 45°.

According to the above-mentioned procedure, the reflective color liquid crystal display device with normally black mode, which is driven actively by TFT and expresses a black display when a voltage is not applied, was obtained.

According to the present embodiment, a bright display can be obtained by providing a scattering film 12 to increase the collecting efficiency of outside light. Further, the deterioration of characteristic caused by disordering alignment of the liquid crystal can be prevented by using a specular reflective metallic reflective electrode 18. In addition to that, visual angle dependency can be reduced.

The characteristics of the front surface of reflective liquid crystal display device having the above-mentioned constitution were measured. The contrast was 12.5 and the reflectance with Y value conversion was 15.3%.

A reflective liquid crystal display device with black and white mode was manufactured by removing the color filter layer 14. The characteristics of front surface of the reflective liquid crystal display device with black and white mode were measured. The contrast was 12.8 and the reflectance with Y value conversion was 32.3%.

The present embodiment, in which a scattering film 12 was provided between the transparent substrate 13 positioned at the upper side and a polymer film 11, was compared with an embodiment, in which a scattering film 12 was provided on a polarization film 10. As a result, in the present embodiment, an image blur, based on parallax caused by the change of the observer's visual angle and that of the incident direction of outside light was reduced. That is, the parallax based on the panel parallax can be reduced by providing a scattering film 12 closer to the liquid crystal cell.

In the present embodiment, a liquid crystal cell with homogeneous alignment field effect birefringence mode was used. However, it is not limited thereto. Any reflective liquid crystal cell comprising one polarization film that can express a display can obtain the same effect as that obtained in the present embodiment.

Further, in the present embodiment, a metallic reflective reflector electrode 18 comprising aluminum was used. However, it is not limited thereto. Any specular reflective metallic reflector electrode comprising silver can obtain the same effect as that obtained in the present embodiment.

Further, in the present embodiment, one scattering film 12 was used. However, it is not limited thereto. A scattering film layer comprising a plurality of scattering films can be used.

Further, in the present embodiment, a polymer film 11 was provided between a polarization film 10 and a scattering film 12. However, it is not limited thereto. A polymer film 11 is not always provided between a polarization film 10 and a scattering film 12. Furthermore, a polymer film layer comprising a plurality of polymer films can be used.

Further, in the present embodiment, polycarbonate was used as a polymer film 11. However, it is not limited thereto. The same effect can be obtained by using, for example, polyalylate or polysulfane.

(A Second Embodiment)

Figure 2:
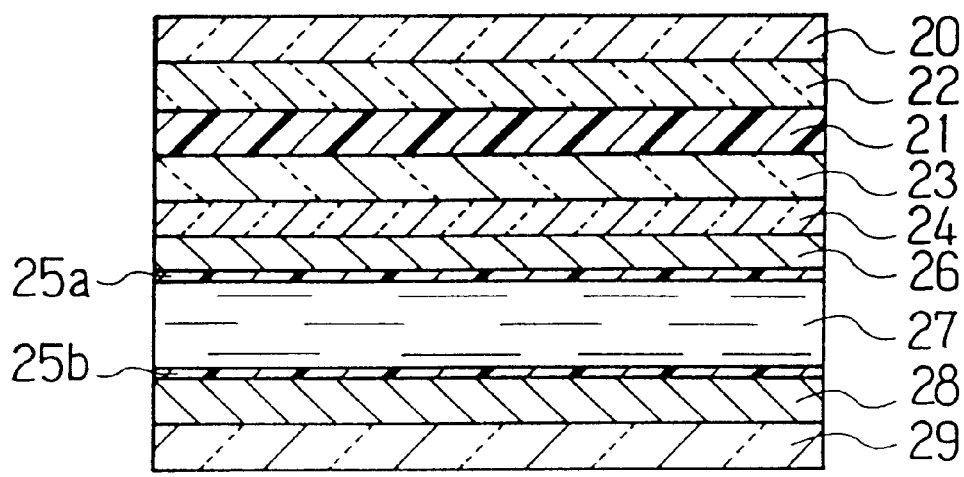
FIG. 2 is a sectional view showing a reflective liquid crystal display device in a second embodiment of the present invention.

FIG. 2 is a sectional view showing a reflective liquid crystal display device of a second embodiment of the present invention. As shown in FIG. 2, a transparent electrode 26 is provided via a color filter layer 24 on a transparent substrate 23, which is positioned at the upper side of the display device. A metallic reflective electrode 28 is provided on a substrate 29 positioned at the lower side of the device. An alignment layer 25a is provided on the transparent electrode 26, and an alignment layer 25b is provided on the metallic reflective electrode 28 respectively. The transparent substrate 23 positioned at the upper side and the substrate 29 positioned at the lower side are arranged parallel to each other with the alignment layers 25a and 25b facing each other. A liquid crystal layer 27 is provided between the alignment layers 25a and 25b. A polymer film 21 is provided on a surface of the transparent substrate 23 opposite to the surface where the transparent electrode 26 is provided. A scattering film 22 and a polarization film 20 are provided in that sequential order on the polymer film 21.

Next, a method for manufacturing the reflective liquid crystal display device having the above-mentioned construction will be explained.

A non-alkali glass substrate was used as a transparent substrate 23 positioned at the upper side and a substrate 29 positioned at the lower side. Pigment dispersion color filter layer 24 with stripe-array of red, green and blue was provided by photolithography on the transparent substrate 23 positioned at the upper side. A transparent electrode 26 composed of oxide of indium and tin as a picture element electrode was provided on the surface of the color filter layer 24. Each picture element electrode is driven actively by thin film transistor (TFT) provided on the transparent substrate 23 positioned at the upper side. A specular reflective metallic reflective electrode 28 was provided on the substrate 29 positioned at the lower side by depositing titanium film having a thickness of 300 nm and aluminum film having a thickness of 200 nm in that sequential order.

5 wt % polyimide solution (the solvent is γ-butyrolactone) was printed on transparent electrode 26 and metallic reflective electrode 28. Then the polyimide solution was hardened at 200° C. and an alignment treatment was carried out by the rotation rubbing method using rayon cloth to obtain the rubbing directions that are anti-parallel to each other. Accordingly, alignment layers 25a and 25b were provided on the transparent electrode 26 and the metallic reflective electrode 28 respectively.

Next, a thermosetting seal resin containing 1.0 wt % of glass fiber having a diameter of 5.7 μm was printed on the periphery of the top surface of the transparent substrate 23 positioned at the upper side and resin beads having a diameter of 4.5 μm were spread on the substrate 29 positioned at the lower side at a ratio of 200 pieces/mm². The transparent substrate 23 positioned at the upper side and the substrate 29 positioned at the lower side were adhered together, and then the thermo-setting seal resin was hardened at 150° C. to manufacture a cell container. In this case, the cell container has a filing portion for filling liquid crystal material. Next, air in the cell container was evacuated while the liquid crystal material was deaerated. Then, fluorine-containing ester based nematic liquid crystal having a birefringence $\Delta n_{LC}=0.09$ was filled in the cell container. Then, the filling portion of the cell container was sealed with ultraviolet ray hardening resin, and the ultraviolet ray hardening resin was hardened by irradiation with ultraviolet ray to manufacture a liquid crystal cell.

Next, a polycarbonate having a retardation of 385 nm and the Z coefficient, $Q_z$ of 0.5 was adhered to the surface of the transparent substrate 23 positioned at the upper side, opposite to the surface where the transparent electrode 26 is provided, as a polymer film 21. The retardation axis direction is at a right angle to the rubbing direction at the side of the transparent substrate 23 positioned at the upper side.

A forward scattering film with scattering range between 0° and 50° measured from the normal line of the film, was adhered to the surface of the polymer film 21 so as to match the projection direction of a bisector direction of the angle indicating the scattering range of the forward scattering film to the surface of the film with the rubbing direction at the side of the transparent substrate 23 positioned at the upper side.

Finally, a neutral gray polarization film, to which anti-glare (AG) treatment and anti-reflection treatment was applied, was adhered to the scattering film 22 as a polarization film 20 in which the angle between the adsorption axis direction and the rubbing direction at the side of the transparent substrate 23 positioned at the upper side is 45°.

According to the above-mentioned procedure, the reflective color liquid crystal display device with normally black mode, which is driven actively by TFT and expresses a black display when a voltage is not applied, was obtained.

According to the constitution of the present embodiment, a bright display can be obtained by providing a scattering film 22 to increase the collecting efficiency of outside light. Further, the deterioration of characteristics caused by disordering alignment of the liquid crystal can be prevented by using a specular surface reflective metallic reflective electrode 28. In addition to that, the visual angle dependency can be reduced.

The characteristics of the front surface of the reflective liquid crystal display device having the above-mentioned constitution were measured. The contrast was 12.4 and the reflectance with Y value conversion was 15.5%.

A reflective liquid crystal display device with black and white mode was manufactured by removing the color filter layer 24. The characteristics of the front surface of the reflective liquid crystal display device with black and white mode were measured. The contrast was 12.7 and the reflectance with Y value conversion was 32.2%.

The present embodiment, in which a scattering film 22 was provided between the polarization film 20 and a polymer film 21, was compared with an embodiment, in which a scattering film 22 was provided on a polarization film 20. As a result, in the present embodiment, an image blur, based on parallax caused by the change of the observer's visual angle and that of the incident direction of outside light was reduced. That is, the parallax based on the panel parallax can be reduced by providing a scattering film 22 closer to the liquid crystal cell.

In the present embodiment, a liquid crystal cell with homogeneous alignment field effect birefringence mode was used. However, it is not limited thereto. Any reflective liquid crystal cell comprising one polarization film that can express a display can obtain the same effect as that obtained in the present embodiment.

Further, in the present embodiment, a metallic reflective reflector electrode 28 comprising aluminum was used. However, it is not limited thereto. Any specular reflective metallic reflector electrode comprising silver can obtain the same effect as that was obtained in the present embodiment.

Further, in the present embodiment, one scattering film 22 was used. However, it is not limited thereto. A scattering film layer comprising a plurality of scattering films can be used.

Further, in the present embodiment, a polymer film 21 was provided between a liquid crystal cell and a scattering film 22. However, it is not limited thereto. A polymer film 21 is not always provided between a liquid crystal cell and a scattering film 22. Furthermore, a polymer film layer comprising a plurality of polymer films can be used.

Further, in the present embodiment, polycarbonate was used as a polymer film 21. However, it is not limited thereto. The same effect can be obtained by using, for example, polyalylate or polysulfane.

(A Third Embodiment)

Figure 3:
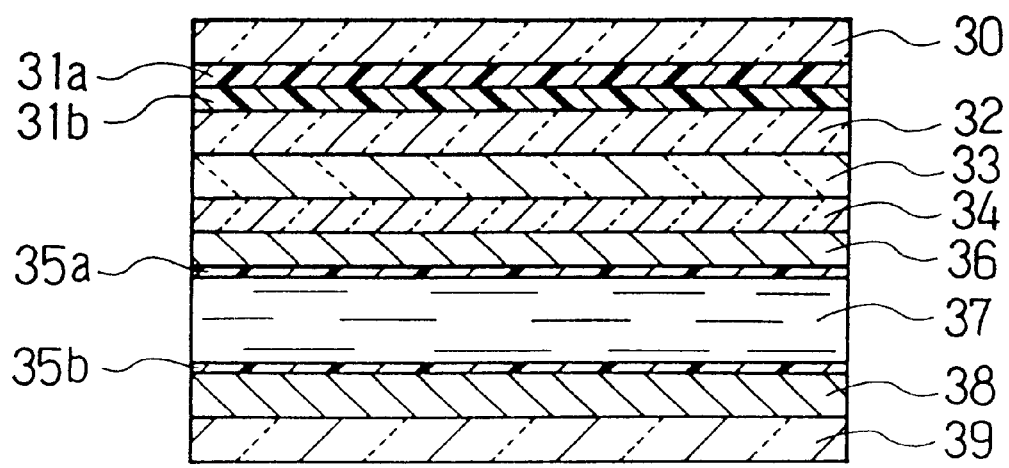
FIG. 3 is a sectional view showing a reflective liquid crystal display device in third, fourth, fifth, sixth, seventh, eighth and ninth embodiments of the present invention.

FIG. 3 is a sectional view showing a reflective liquid crystal display device of a third embodiment of the present invention. As shown in FIG. 3, a transparent electrode 36 is provided via a color filter layer 34 on a transparent substrate 33, which is positioned at the upper side of the display device. A metallic reflective electrode 38 is provided on a substrate 39 positioned at the lower side of the device. An alignment layer 35a is provided on the transparent electrode 36, and an alignment layer 35b is provided on the metallic reflective electrode 38 respectively. The transparent substrate 33 positioned at the upper side and the substrate 39 positioned at the lower side are arranged parallel to each other with the alignment layers 35a and 35b facing each other. A liquid crystal layer 37 is provided between the alignment layers 35a and 35b. A scattering film 32 is provided on a surface of the transparent substrate 33 positioned at the upper side, opposite to the surface where the transparent electrode 36 is provided. Polymer films 31b, 31a are provided in that sequential order on the scattering film 32 and a polarization film 30 is provided on the polymer film 31a.

Figure 4:
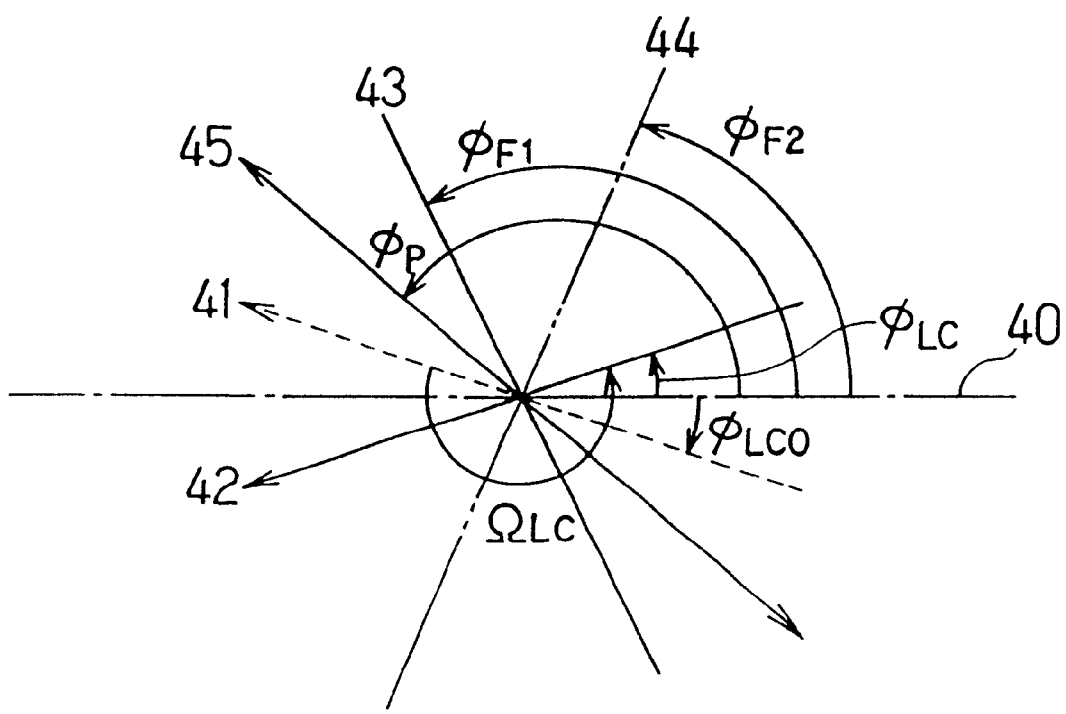
FIG. 4 illustrates the optical properties of a reflective liquid crystal display device in third, fourth, fifth, sixth, seventh, eighth, ninth, tenth and eleventh embodiments of the present invention.

FIG. 4 is a view illustrating the optical properties of a reflective liquid crystal display device in the third embodiment of the present invention. In FIG. 4, 40 indicates a base line, 41 indicates the alignment direction of the liquid crystal molecule on the substrate 39 positioned at the lower side, 42 indicates the alignment direction of the liquid crystal molecule on the transparent substrate 33 positioned at the upper side, 43 indicates the retardation axis direction of polymer film 31b at the side of the liquid crystal layer 37, 44 indicates the retardation axis direction of polymer film 31a at the side of the polarization film 30 and 45 indicates the adsorption axis direction of the polarization film 30 respectively.

$\phi_{LC0}$ indicates the angle between the alignment direction 41 of the liquid crystal molecule on the substrate 39 positioned at the lower side and the base line 40 when the twist direction of the liquid crystal is positive. $\phi_{LC}$ indicates the angle between the alignment direction 42 of the liquid crystal molecule on the transparent substrate 33 positioned at the upper side and the base line 40 when the twist direction of the liquid crystal is positive. $\phi_{F1}$ indicates the angle between the retardation axis direction 43 of the polymer film 31b and the base line 40 when the twist direction of the liquid crystal is positive. $\phi_{F2}$ indicates the angle between the retardation axis direction 44 of the polymer film 31a and the base line 40 when the twist direction of the liquid crystal is positive. $\phi_P$ indicates the angle between the adsorption axis direction 45 of the polarization film 30 and the base line 40 when the twist direction of the liquid crystal is positive. $\Omega_{LC}$ indicates the twist direction and twist angle of the liquid crystal.

Next, a method for manufacturing the reflective liquid crystal display device having the above-mentioned construction will be described.

A glass substrate was used as the transparent substrate 33 positioned at the upper side and the substrate 39 positioned at the lower side. Pigment dispersion color filter layer 34 with stripe-array of red, green and blue was provided by photolithography. A transparent electrode 36 composed of oxide of indium and tin as a picture element electrode was provided on the surface of the color filter 34. A specular reflective metallic reflective electrode 38 was provided on the substrate 39 positioned at the lower side by depositing titanium film having a thickness of 300 nm and silver film having a thickness of 200 nm in that sequential order.

5 wt % polyimide solution (the solvent is N-methyl-2-pyrrolidine) was printed on a transparent electrode 36 and a metallic reflective electrode 38. Then the polyimide solution was hardened at 200° C. and an alignment treatment was carried out by the rotation rubbing method using rayon cloth to obtain a predetermined twist angle. Accordingly, alignment layers 35a and 35b were provided on the transparent electrode 36 and the metallic reflective electrode 38 respectively.

Next, a thermosetting seal resin containing 1.0 wt % of glass fiber having a predetermined diameter was printed on the periphery of the top surface of the transparent substrate 33 positioned at the upper side and resin beads having a predetermined diameter were spread on the substrate 39 positioned at the lower side at a ratio of 200 pieces/mm². The transparent substrate 33 positioned at the lower side and the substrate 39 positioned at the lower side were adhered together, and then the thermosetting seal resin was hardened at 150° C. to manufacture a cell container. In this case, the cell container has a filling portion for filling liquid crystal material. Next, air in the cell container is evacuated while the liquid crystal material is deaerated. The liquid crystal, which is obtained by mixing a predetermined chiral liquid crystal with ester-based nematic crystal having a birefringence $\Delta n_{LC}$=0.13, was filled in the cell container. Then, the filling portion of the cell container was sealed with ultraviolet ray hardening resin, and the ultraviolet ray hardening resin was hardened by irradiation with ultraviolet ray to manufacture a liquid crystal cell.

A forward scattering film with scattering range between 0° and 50° measured from the normal line of the film as a scattering film 32, was adhered to the surface of the transparent substrate 33 positioned at the upper side opposite to the surface where the transparent electrode 36 was provided, so that the projection direction of a bisector direction of the angle indicating the scattering range of the forward scattering film to the surface of the film is at a right angle with the base line 40.

Next, a polycarbonate was adhered to the surface of the scattering film layer 32 as a polymer film 31b and 31a so that $\phi_{F1}$ and $\phi_{F2}$ have a predetermined angle respectively.

Finally, a neutral gray polarization film, to which anti-glare (AG) treatment was applied, was adhered to the polymer film 31a as a polarization film 30 so as that $\phi_P$ has a predetermined angle.

According to the above-mentioned steps, a reflective liquid crystal display device was obtained.

The values of the reflective liquid crystal display device are set as follows. $\phi_{LC0}$=−35°, $\phi_{LC}$=35°, $\Omega_{LC}$=250°, $\phi_{F1}$=125°, $\phi_{F2}$=170° and $\phi_P$=125°. When $n_x(1)$ indicates the extraordinary refractive index of polymer film 31b at the side of the liquid crystal layer 37, $n_y(1)$ indicates the ordinary refractive index of polymer film 31b at the side of the liquid crystal layer 37, $d_{Film}(1)$ indicates the thickness of polymer film 31b, the retardation of the polymer film 31b is obtained by following formula: $R_{Film}(1)=\{n_x(1)-n_y(1)\}\cdot d_{Film}(1)$.

When $n_x(2)$ indicates the extraordinary refractive index of polymer film 31a at the side of the polarization film 30, $n_y(2)$ indicates the ordinary refractive index of polymer film 31a at the side of the polarization film 30, $d_{Film}(2)$ indicates the thickness of polymer film 31a, the retardation of the polymer film 31a is obtained by following formula: $R_{Film}(2)=\{n_x(2)-n_y(2)\}\cdot d_{Film}(2)$. When $\Delta n_{LC}$ indicates the birefringence of the nematic liquid crystal, $d_{LC}$ indicates the thickness of the liquid crystal layer 37, the birefringence difference was obtained by following formula: $\Delta(R)=(R_{Film}(1)+R_{Film}(2))-\Delta n_{LC} \cdot d_{LC}$.

When the optical property of the reflective liquid crystal display device is measured while $\Delta n_{LC} \cdot d_{LC}$ is changed for the birefringence difference $\Delta(R)$ to satisfy −0.15 μm, it was confirmed that a reflective liquid crystal display device with normally black mode, which can express a black display in achromatic color with low reflectance and a white display in achromatic color with high reflectance when $\Delta n_{LC} \cdot d_{LC}$ is in a range between 0.6 μm to 1.2 μm, was realized. That is, when $\Delta n_{LC} \cdot d_{LC}$ is in a range between 0.6 μm to 1.2 μm, the liquid crystal has enough birefringence difference to express black display and white display clearly. In addition to that, coloring caused by the birefringence of liquid crystal can be maintained.

When the birefringence difference, $\Delta(R)$, satisfies a range between −0.1 μm to −0.2 μm, and a voltage is applied to change the display from a black display to a white display, it was confirmed that the color of display was changed in a range of achromatic color in practice. That is, when the birefringence difference, $\Delta(R)$, is in a range between −0.1 μm to −0.2 μm, $\phi_{F1}-\phi_{LC}$ is 90°±20°, $\phi_{F2}-\phi_{F1}$ is 45°±20°, coloring caused by the birefringence of the liquid crystal layer 37 can be prevented when the display is changed from a black display to a white display, especially, a black display when an off-voltage is applied is expressed. Accordingly, a reflective liquid crystal display device that expresses a black display in achromatic color with low reflectance and a white display in achromatic color with high reflectance, that is a high contrast, can be obtained.

Since $\phi_P-\phi_{F2}$ is −45°±20°, the birefringence can be utilized with almost maximum efficiency and the utilization rate of the light can be increased.

The twist angle of the liquid crystal affects the duty ratio, that is, the reciprocal of the possible number of selective electrodes to be used when a simple matrix color liquid crystal display device is driven. When the twist angle becomes larger and larger, the duty ratio can be reduced more and more, and as a result, the number of selective electrodes can be increased. Therefore, the number of pixels can be increased. In the present embodiment, when the twist angle is in a range between 220° to 260°, it was confirmed that the excellent characteristics can be obtained by driving a liquid crystal display device at a duty ratio less than 1/200.

When $\Delta n_{LC} \cdot d_{LC}$ is in a range between 0.8 μm to 1.1 μm and the twist angle is in a range between 240° to 260°, it was confirmed that the excellent characteristics can be obtained by driving a liquid crystal display device at a duty ratio less than 1/240.

When $R_{Film}(1)$ satisfies 0.3 μm±0.1 μm and $R_{Film}(2)$ satisfies 0.5 μm±0.1 μm, it was confirmed that the reflectance of black when off-voltage is applied to can be reduced.

The values of the reflective liquid crystal display device are set as follows. $\Delta n_{LC} \cdot d_{LC} = 1.000$ μm, $R_{Film}(1)=0.350$ μm, $R_{Film}(2)=0.500$ μm, $\phi_{LC0}=-35°$, $\phi_{LC}=35°$, $\Omega_{LC}=250°$, $\phi_{F1}=125°$, $\phi_{F2}=170°$ and $\phi_P=125°$. Under the above-mentioned condition, it was confirmed that $\Delta(R)=(R_{Film}(1)+R_{Film}(2))-\Delta n_{LC} \cdot d_{LC}=-0.150$ μm, $\phi_{F1}-\phi_{LC}=90°$, $\phi_{F2}-\phi_{F1}=45°$ and $\phi_P-\phi_{F2}=-45°$.

The characteristics of the front surface of the reflective liquid crystal display device with black and white mode were measured at a duty ratio of 1/240. The contrast was 7.2 and the reflectance with Y value conversion was 14.2%. It was also confirmed that 16 grade 4096 color display can be expressed since the color is changed from black to white in achromatic color.

Further, a reflective liquid crystal display device with black and white mode was manufactured by removing the color filter layer 34 and the characteristics of the front surface were measured. The contrast was 7.1 and the reflectance with Y value conversion was 30.9%.

Further, in the present embodiment, polycarbonate was used as a polymer film Further, a reflective liquid crystal display device with a black and white mode 31a and 31b. However, it is not limited thereto. The same effect can be obtained by using, for example, polyalylate or polysulfane.

Further, in the present embodiment, a metallic reflective reflector electrode 38 comprising silver was used. However, it is not limited thereto. Any specular reflective metallic reflector electrode comprising aluminum can obtain the same effect as that was obtained in the present embodiment.

Further, in the present embodiment, one scattering film 32 was provided between a polymer film 31b and a liquid crystal cell. However, it is not limited thereto. A scattering film layer comprising a plurality of scattering films can be used. Further, at least one scattering film can be provided between a polarization film 30 and a polymer film 31a.

(A Fourth Embodiment)

The method for manufacturing and construction of the reflective liquid crystal display device of the fourth embodiment are common to those of the third embodiment in this invention. Therefore, FIG. 3 (a sectional view showing a reflective liquid crystal display device) and FIG. 4 (a view illustrating the optical characteristic of reflective liquid crystal display device) are used to explain a reflective liquid crystal display device in the fourth embodiment.

The values of the reflective liquid crystal display device are set as follows. $\phi_{LC0}=-35°$, $\phi_{LC}=35°$, $\Omega_{LC}=250°$, $\phi_{F1}=105°$, $\phi_{F2}=165°$ and $\phi_P=145°$.

When the optical property of the reflective liquid crystal display device is measured while $\Delta n_{LC} \cdot d_{LC}$ is changed for the birefringence difference $\Delta(R)=(R_{Film}(1)+R_{Film}(2))-\Delta n_{LC} \cdot d_{LC}$ to satisfy 0.45 μm, it was confirmed that a reflective liquid crystal display device with normally black mode, which can express a black display in achromatic color with low reflectance and a white display in achromatic color with high reflectance when $\Delta n_{LC} \cdot d_{LC}$ is in a range between 0.6 μm to 1.2 μm, was realized. That is, when $\Delta n_{LC} \cdot d_{LC}$ is in a range between 0.6 μm to 1.2 μm, the liquid crystal has enough birefringence difference to express black display and white display clearly. In addition to that, coloring caused by the birefringence of liquid crystal can be maintained.

When the birefringence difference, $\Delta(R)$, satisfies a range between 0.4 μm to 0.5 μm, and a voltage is applied to change the display from a black display to a white display, it was confirmed that the color of display was changed in a range of achromatic color in practice. That is, when the birefringence difference, $\Delta(R)$, is in a range between 0.4 μm to 0.5 μm, $\phi_{F1}-\phi_{LC}$ is 70°±20°, $\phi_{F2}-\phi_{F1}$ is 60°±20°, coloring caused by the birefringence of the liquid crystal layer 37 can be prevented when the display is changed from a black display to a white display, especially, a black display when an off-voltage is applied is expressed. Accordingly, a reflective liquid crystal display device that expresses a black display in achromatic color with low reflectance and a white display in achromatic color with high reflectance, that is a high contrast, can be obtained.

Since $\phi_P-\phi_{F2}$ is −20°±20° the birefringence can be utilized with almost maximum efficiency and the utilization rate of the light can be increased.

The twist angle of the liquid crystal affects the duty ratio, that is, the reciprocal of the possible number of selective electrodes to be used when a simple matrix color liquid crystal display device is driven. When the twist angle becomes larger and larger, the duty ratio can be reduced more and more, and as a result, the number of selective electrodes can be increased. Therefore, the number of pixels can be increased. In the present embodiment, when the twist angle is in a range between 220° to 260°, it was confirmed that the excellent characteristics can be obtained by driving a liquid crystal display device at a duty ratio less than 1/200.

When $\Delta n_{LC} \cdot d_{LC}$ is in a range between 0.8 μm to 1.1 μm and the twist angle is in a range between 240° to 260°, it was confirmed that the excellent characteristics can be obtained by driving a liquid crystal display device at a duty ratio less than 1/240.

When $R_{Film}(1)$ satisfies 0.75 μm±0.1 μm, and $R_{Film}(2)$ satisfies 0.6 μm±0.1 μm, it was confirmed that the reflectance of black when off-voltage is applied can be reduced.

The values of the reflective liquid crystal display device are set as follows. $\Delta n_{LC} \cdot d_{LC}=0.960$ μm, $R_{Film}(1)=0.800$ μm, $R_{Film}(2)=0.610$ μm, $\phi_{LC0}=-35°$, $\phi_{LC}=35°$, $\Omega_{LC}=250°$, $\phi_{F1}=105°$, $\phi_{F2}=165°$ and $\phi_P=145°$. Under the above-mentioned condition, it was confirmed that $\Delta(R)=(R_{Film}(1)+R_{Film}(2))-\Delta n_{LC} \cdot d_{LC}=0.450$ μm, $\phi_{F1}-\phi_{LC}=70°$, $\phi_{F2}-\phi_{F1}=60°$ and $\phi_P-\phi_{F2}=-20°$.

The characteristics of the front surface of the reflective liquid crystal display device with black and white mode were measured at a duty ratio of 1/240. The contrast was 7.4 and the reflectance with Y value conversion was 15.3%. It was also confirmed that 16 grade 4096 color display can be expressed since the color is changed from black to white in achromatic color.

Further, a reflective liquid crystal display device with a black and white mode was manufactured by removing the color filter layer 34 and the characteristics of the front surface were measured. The contrast was 7.4 and the reflectance with Y value conversion was 31.8%.

(A Fifth Embodiment)

The method for manufacturing and construction of a reflective liquid crystal display device of the fifth embodiment are common to those of the third embodiment in this invention. Therefore, FIG. 3 (a sectional view showing a reflective liquid crystal display device) and FIG. 4 (a view illustrating the optical characteristics of the reflective liquid crystal display device) are used to explain a reflective liquid crystal display device in the fifth embodiment.

The values of the reflective liquid crystal display device are set as follows. $\phi_{LC0}=-35°$, $\phi_{LC}=35°$, $\Omega_{LC}=250°$, $\phi_{F1}=180°$, $\phi_{F2}=60°$ and $\phi_P=15°$ or 105°.

When the optical property of the reflective liquid crystal display device is measured while $\Delta n_{LC} \cdot d_{LC}$ is changed for the birefringence difference $\Delta(R)=(R_{Film}(1)+R_{Film}(2))-\Delta n_{LC}\cdot d_{LC}$ to satisfy 0.2 μm, it was confirmed that a reflective liquid crystal display device with normally black mode, which can express a black display in achromatic color with low reflectance and a white display in achromatic color with high reflectance when $\Delta n_{LC}\cdot d_{LC}$ is in a range between 0.6 μm to 1.2 μm, was realized. That is, when $\Delta n_{LC}\cdot d_{LC}$ is in a range between 0.6 μm to 1.2 μm, the liquid crystal has enough birefringence difference to express black display and white display clearly. In addition to that, coloring caused by the birefringence of liquid crystal can be maintained.

When the birefringence difference, $\Delta(R)$, satisfies a range between 0.15 μm to 0.3 μm, and a voltage is applied to change the display from a black display to a white display, it was confirmed that the color of the display was changed in a range of achromatic color in practice. That is, when the birefringence difference, $\Delta(R)$, is in a range between 0.15 μm to 0.3 μm, $\phi_{F1}-\phi_{LC}$ is $145°\pm20°$, $\phi_{F2}-\phi_{F1}$ is $-120°\pm20°$, coloring caused by the birefringence of the liquid crystal layer 37 can be prevented when the display is changed from a black display to a white display, especially, a black display when an off-voltage is applied is expressed. Accordingly, the reflective liquid crystal display device expresses a black display in achromatic color with low reflectance and a white display in achromatic color with high reflectance, that is, a high contrast.

Since $\phi_P-\phi_{F2}$ is $\pm45°\pm20°$, the birefringence can be utilized with almost maximum efficiency and the utilization rate of the light can be increased.

The twist angle of the liquid crystal affects the duty ratio, that is, the reciprocal of the possible number of selective electrodes to be used when a simple matrix color liquid crystal display device is driven. When the twist angle becomes larger and larger, the duty ratio can be reduced more and more, and as a result, the number of selective electrodes can be increased. Therefore, the number of pixels can be increased. In the present embodiment, when the twist angle is in a range between 220° to 260°, it was confirmed that the excellent characteristics can be obtained by driving a liquid crystal display device at a duty ratio less than 1/200.

When $\Delta n_{LC}\cdot d_{LC}$ is in a range between 0.8 μm to 1.1 μm and the twist angle is in a range between 240° to 260°, it was confirmed that the excellent characteristics can be obtained by driving a liquid crystal display device at a duty ratio less than 1/240.

When $R_{Film}(1)$ satisfies 0.3 μm±0.1 μm, $R_{Film}(2)$ satisfies 0.75 μm±0.1 m, it was confirmed that the reflectance of black when off-voltage is applied can be reduced.

The values of the reflective liquid crystal display device are set as follows. $\Delta n_{LC}\cdot d_{LC}=0.860$ μm, $R_{Film}(1)=0.310$ μm, $R_{Film}(2)=0.760$ μm, $\phi_{LC0}=-35°$, $\phi_{LC}=35°$, $\Omega_{LC}250°$, $\phi_{F1}=180°$, $\phi_{F2}=75°$ and $\phi_P=25°$. Under the above-mentioned condition, it was confirmed that $\Delta(R)=(R_{Film}(1)+R_{Film}(2))-\Delta n_{LC}\cdot d_{LC}=0.210$ μm, $\phi_{F1}-\phi_{LC}=145°$, $\phi_{F2}-\phi_{F1}=-105°$ and $\phi_P-\phi_{F2}=-50°$.

The characteristics of the front surface of the reflective liquid crystal display device with black and white mode were measured at a duty ratio of 1/240. The contrast was 7.3 and the reflectance with Y value conversion was 14.8%. It was also confirmed that 16 grade 4096 color display can be expressed since the color is changed from black to white in achromatic color.

Further, a reflective liquid crystal display device with a black and white mode was manufactured by removing the color filter layer 34 and the characteristics of the front surface were measured. The contrast was 7.2 and the reflectance with Y value conversion was 30.7%.

(A Sixth Embodiment)

The method for manufacturing and construction of reflective liquid crystal display device of the sixth embodiment are common to those of the third embodiment in this invention. Therefore, FIG. 3 (a sectional view showing a reflective liquid crystal display device) and FIG. 4 (a view illustrating the optical characteristics of the reflective liquid crystal display device) are used to explain a reflective liquid crystal display device in the sixth embodiment.

The values of the reflective liquid crystal display device are set as follows. $\phi_{LC0}=-35°$, $\phi_{LC}=35°$, $\Omega_{LC}=250°$, $\phi_{F1}=125°$, $\phi_{F2}=80°$ and $\phi_P=140°$.

When the optical property of the reflective liquid crystal display device is measured while $\Delta n_{LC}\cdot d_{LC}$ is changed for the birefringence difference $\Delta(R)=(R_{Film}(1)+R_{Film}(2))-\Delta n_{LC}\cdot d_{LC}$ to satisfy 0.1 μm, it was confirmed that a reflective liquid crystal display device with normally black mode, which can express a black display in achromatic color with low reflectance and a white display in achromatic color with high reflectance when $\Delta n_{LC}\cdot d_{LC}$ is in a range between 0.6 μm to 1.2 μm, was realized. That is, when $\Delta n_{LC}\cdot d_{LC}$ is in a range between 0.6 μm to 1.2 μm, the liquid crystal has enough birefringence difference to express black display and white display clearly. In addition to that, coloring caused by the birefringence of liquid crystal can be maintained.

When the birefringence difference, $\Delta(R)$, satisfies a range between 0.05 μm to 0.15 μm, and a voltage is applied to change the display from a black display to a white display, it was confirmed that the color of display was changed in a range of achromatic color in practice. That is, when the birefringence difference, $\Delta(R)$, is in a range between 0.05 μm to 0.15 μm, $\phi_{F1}-\phi_{LC}$ is $90°\pm20°$, $\phi_{F2}-\phi_{F1}$ is $-45°\pm20°$, coloring caused by the birefringence of the liquid crystal layer 37 can be prevented when the display is changed from a black display to a white display, especially, a black display when an off-voltage is applied is expressed. Accordingly, the reflective liquid crystal display device expresses a black display in achromatic color with low reflectance and a white display in achromatic color with high reflectance, that is, a high contrast.

Since $\phi_P-\phi_{F2}$ is $60°\pm20°$, the birefringence can be utilized with almost maximum efficiency and the utilization rate of the light can be increased.

The twist angle of the liquid crystal affects the duty ratio, that is, the reciprocal of the possible number of selective electrodes to be used when a simple matrix color liquid crystal display device is driven. When the twist angle becomes larger and larger, the duty ratio can be reduced more and more, and as a result, the number of selective electrodes can be increased. Therefore, the number of pixels can be increased. In the present embodiment, when the twist angle is in a range between 220° to 260°, it was confirmed that the excellent characteristics can be obtained by driving a liquid crystal display device at a duty ratio less than 1/200.

When $\Delta n_{LC}\cdot d_{LC}$ is in a range between 0.8 μm to 1.1 μm and the twist angle is in a rang between 240° to 260°, it was confirmed that the excellent characteristics can be obtained by driving a liquid crystal display device at a duty ratio less than 1/240.

When $R_{Film}(1)$ satisfies 0.6 μm±0.1 μm, and $R_{Film}(2)$ satisfies 0.5 μm±0.1 μm, it was confirmed that the reflectance of black when off-voltage is applied can be reduced.

The values of the reflective liquid crystal display device are set as follows. $\Delta n_{LC}\cdot d_{LC}=0.910$ μm, $R_{Film}(1)=0.560$ μm, $R_{Film}(2)=0.460$ μm, $\phi_{LC0}=-35°$, $\phi_{LC}=35°$, $\Omega_{LC}250°$, $\phi_{F1}=125°$, $\phi_{F2}=80°$ and $\phi_P=140°$. Under the above-mentioned condition, it was confirmed that $\Delta(R)=(R_{Film}(1)+R_{Film}(2))-\Delta n_{LC}\cdot d_{LC}=0.110$ μm, $\phi_{F1}-\phi_{LC}=90°$, $\phi_{F2}-\phi_{F1}=-45°$ and $\phi_P-\phi_{F2}=60°$.

The characteristics of the front surface of the reflective liquid crystal display device with black and white mode were measured at a duty ratio of 1/240. The contrast was 7.2 and the reflectance with Y value conversion was 14.0%. It was also confirmed that 16 grade 4096 color display can be expressed since the color is changed from black to white in achromatic color.

Further, a reflective liquid crystal display device with a black and white mode was manufactured by removing the color filter layer 34 and the characteristics of the front surface were measured. The contrast was 7.4 and the reflectance with Y value conversion was 30.8%.

(A Seventh Embodiment)

The method for manufacturing and construction of reflective liquid crystal display device of the seventh embodiment are common to those of the third embodiment in this invention. Therefore, FIG. 3 (a sectional view showing a reflective liquid crystal display device) and FIG. 4 (a view illustrating the optical characteristics of the reflective liquid crystal display device) are used to explain a reflective liquid crystal display device in the seventh embodiment.

The values of the reflective liquid crystal display device are set as follows. $\phi_{LC0}=-35°$, $\phi_{LC}=35°$, $\Omega_{LC}=250°$, $\phi_{F1}=145°$, $\phi_{F2}=85°$ and $\phi_P=20°$.

When the optical property of the reflective liquid crystal display device is measured while $\Delta n_{LC} \cdot d_{LC}$ is changed for the birefringence difference $\Delta(R)=(R_{Film}(1)+R_{Film}(2))-\Delta n_{LC} \cdot d_{LC}$ to satisfy 0.35 μm, it was confirmed that a reflective liquid crystal display device with normally black mode, which can express a black display in achromatic color with low reflectance and a white display in achromatic color with high reflectance when $\Delta n_{LC} d_{LC}$ is in a range between 0.6 μm to 1.2 μm, was realized. That is, when $\Delta n_{LC} \cdot d_{LC}$ is in a range between 0.6 μm to 1.2 μm, the liquid crystal has enough birefringence difference to express black display and white display dearly. In addition to that, coloring caused by the birefringence of liquid crystal can be maintained.

When the birefringence difference, $\Delta(R)$, satisfies a range between 0.3 μm to 0.4 μm, and a voltage is applied to change the display from a black display to a white display, it was confirmed that the color of display was changed in a range of achromatic color in practice. That is, when the birefringence difference, $\Delta(R)$, is in a range between 0.3 μm to 0.4 μm, $\phi_{F1}-\phi_{LC}$ is 110°±20°, $\phi_{F2}-\phi_{F1}$ is 60°±20°, coloring caused by the birefringence of the liquid crystal layer 37 can be prevented when the display is changed from a black display to a white display, especially, a black display when an off-voltage is applied is expressed. Accordingly, the reflective liquid crystal display device expresses a black display in achromatic color with low reflectance and a white display in achromatic color with high reflectance, that is, a high contrast.

Since $\phi_P-\phi_{F2}$ is (±45–20°)±20°, the birefringence can be utilized with almost maximum efficiency and the utilization rate of the light can be increased.

The twist angle of the liquid crystal affects the duty ratio, that is, the reciprocal of the possible number of selective electrodes to be used when a simple matrix color liquid crystal display device is driven. When the twist angle becomes larger and larger, the duty ratio can be reduced more and more, and as a result, the number of selective electrodes can be increased. Therefore, the number of pixels can be increased. In the present embodiment, when the twist angle is in a range between 220° to 260°, it was confirmed that the excellent characteristics can be obtained by driving a liquid crystal display device at a duty ratio less than 1/200.

When $\Delta n_{LC} \cdot d_{LC}$ is in a range between 0.8 μm to 1.1 μm and the twist angle is in a range between 240° to 260°, it was confirmed that the excellent characteristics can be obtained by driving a liquid crystal display device at a duty ratio less than 1/240.

When $R_{Film}(1)$ satisfies 0.5 μm±0.1 μm, $R_{Film}(2)$ satisfies 0.7 μm±0.1 m, it was confirmed that the reflectance of black when off-voltage is applied can be reduced.

The values of the reflective liquid crystal display device are set as follows. $\Delta n_{LC} \cdot d_{LC}=0.910$ μm, $R_{Film}(1)=0.550$ μm, $R_{Film}(2)=0.720$ μm, $\phi_{LC0}=-35°$, $\phi_{LC}=35°$, $\Omega_{LC}=250°$, $\phi_{F1}=145°$, $\phi_{F2}=85°$ and $\phi_P=20°$. Under the above-mentioned condition, it was confirmed that $\Delta(R)=(R_{Film}(1)+R_{Film}(2))-\Delta n_{LC} \cdot d_{LC}=0.360$ μm, $\phi_{F1}-\phi_{LC}=110°$, $\phi_{F2}-\phi_{F1}=-60°$ and $\phi_P-\phi_{F2}=-65°$.

The characteristics of the front surface of the reflective liquid crystal display device with black and white mode were measured at a duty ratio of 1/240. The contrast was 7.1 and the reflectance with Y value conversion was 14.7%. It was also confirmed that 16 grade 4096 color display can be expressed since the color is changed from black to white in achromatic color.

Further, a reflective liquid crystal display device with a black and white mode was manufactured by removing the color filter layer 34 and the characteristics of the front surface were measured. The contrast was 7.3 and the reflectance with Y value conversion was 31.2%.

(A Eighth Embodiment)

The method for manufacturing and construction of a reflective liquid crystal display device of the eighth embodiment are common to those of the third embodiment in this invention. Therefore, FIG. 3 (a sectional view showing a reflective liquid crystal display device) and FIG. 4 (a view illustrating the optical characteristics of the reflective liquid crystal display device) are used to explain a reflective liquid display device in the eighth embodiment.

Figure 5A:
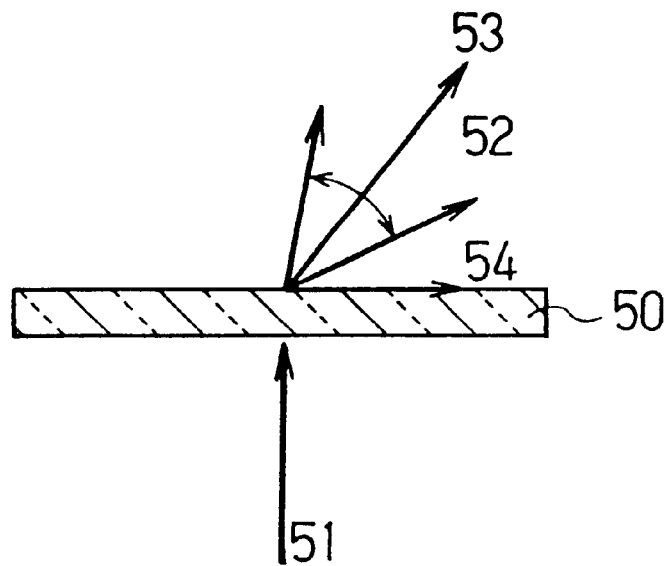
FIG. 5(a) is a conceptual view showing the scattering direction of a scattering film layer comprising one forward scattering film, seen from the side, of a reflective liquid crystal display device in an eighth embodiment of the present invention.

FIG. 5(a) is a conceptual view showing the scattering direction of a scattering film comprising one forward scattering film, seen from the side, of the reflective liquid crystal display device. In FIG. 5(a), 50 indicates a forward scattering film, 51 indicates a direction of incident light, 52 indicates an angle indicating a range, 53 indicates an angle indicating a bisector direction of the angle 52 indicating the scattering range and 54 indicates a projection direction of the bisector direction 53 of angle 52 indicating the scattering range to the surface of the film.

Figure 5B:
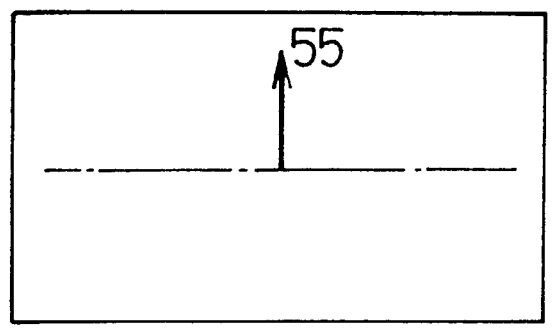
FIG. 5(b) is a conceptual view showing the scattering direction of a scattering film layer comprising one forward scattering film, seen from the top, of a reflective liquid crystal display device in an eighth embodiment of the present invention.
Figure 5C:
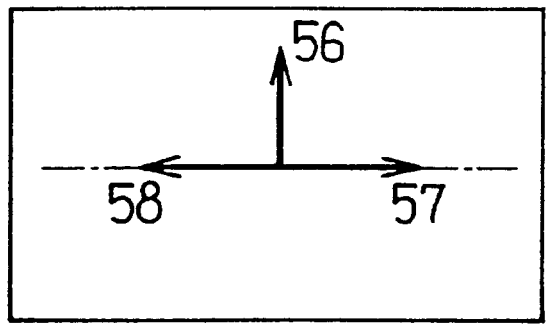
FIG. 5(c) is a conceptual view showing the scattering direction of a scattering film layer comprising three forward scattering films, seen from the top, of a reflective liquid crystal display device in an eighth embodiment of the present invention.

FIG. 5(b) is a conceptual view showing the scattering direction of the scattering film comprising one forward scattering film, seen from the top, of the reflective liquid crystal display device. In FIG. 5(b), 55 indicates the projection direction of a bisector direction of the angle 52 indicating the scattering range to the surface of the film. FIG. 5(c) is a conceptual; view showing the scattering direction of a scattering film comprising three forward scattering films, seen from the top, of the reflective liquid crystal display device. In FIG. 5(c), 56, 57 and 58 indicate the projection direction of a bisector direction of the angle indicating the scattering range to the surface of the film.

In the present embodiment, the values of the reflective liquid crystal display device are set as follows. $\Delta n_{LC} \cdot d_{LC}=1.000$ μm, $R_{Film}(1)=0.350$ μm, $R_{Film}(2)=0.500$ μm, $\phi_{LC0}=-35°$, $\phi_{LC}=35°$, $\Omega_{LC}=250°$, $\phi_{F1}=125°$, $\phi_{F2}=170°$ and $\phi_P=125°$.

In the third embodiment of the present invention, a forward scattering film, with scattering range between 0° and 50° measured from the normal line of the film as a scattering film 32, was adhered to the surface of the transparent substrate 33 positioned at the upper side opposite to the surface where the transparent electrode 36 was provided, so that the projection direction 55 of a bisector direction of angle indicating the scattering range of the forward scattering film to the surface of the film is at a right angle with the base line 40. That is, as shown in FIG. 5(b), the scattering film 32 was adhered to the transparent substrate 33 positioned at the upper side.

According to the above-mentioned construction, a reflective liquid crystal display device with high collective efficiency of light and low visual angle dependency can be obtained However, in the present embodiment, three forward scattering films, which were layered, were used as a scattering film 32. Three forward scattering films were adhered as follows. One of them has a scattering range between 0° and 50° measured from the normal line and has a projection direction 56 of the bisector direction of the angle indicating the scattering range to the surface of the film. Others have a scattering range between 10° and 60° measured from the normal line and a projection direction 57 or 58 of the bisector direction of the angle indicating the scattering range to the surface of the film respectively.

According to the above-mentioned construction, a reflective liquid crystal display device with extremely high collective efficiency of light, natural change of visual angle and low visual angle dependency can be realized.

Furthermore, in the present embodiment, one or three forward scattering films were used. However, it is not limited thereto. When two, four or more forward scattering films whose projection directions of the bisector direction of the angle indicating the scattering range to the surface of the film are different are used, the same effect can be obtained. In particular, when two, three or four forward scattering films are used and the projection directions of the bisector direction of the angle indicating the scattering range to the surface of the film are at a right angle or anti-parallel to each other, the same effect can be obtained.

(A Ninth Embodiment)

The method for manufacturing and construction of a reflective liquid crystal display device of the ninth embodiment are common to those of the third embodiment in this invention. Therefore, FIG. 3 (a sectional view showing a reflective liquid crystal display device) and FIG. 4 (a view illustrating the optical characteristics of the reflective liquid crystal display device) and FIG. 6 are used to explain a reflective liquid crystal display device in the ninth embodiment.

Figure 6A:
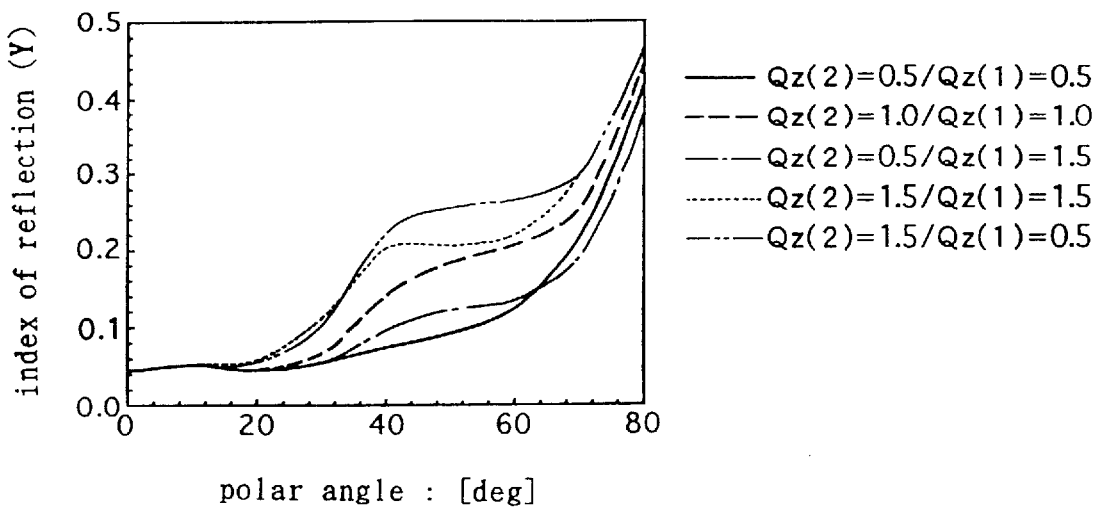
FIG. 6(a) shows the change of the reflectance of black when an off-voltage is applied with respect to the change of visual angle in the right direction for a reflective liquid crystal display device in a ninth embodiment of the present invention.

FIG. 6(a) shows the change of the reflectance of black when an off-voltage is applied with respect to the change of visual angle in the right direction of a reflective liquid crystal display device.

Figure 6B:
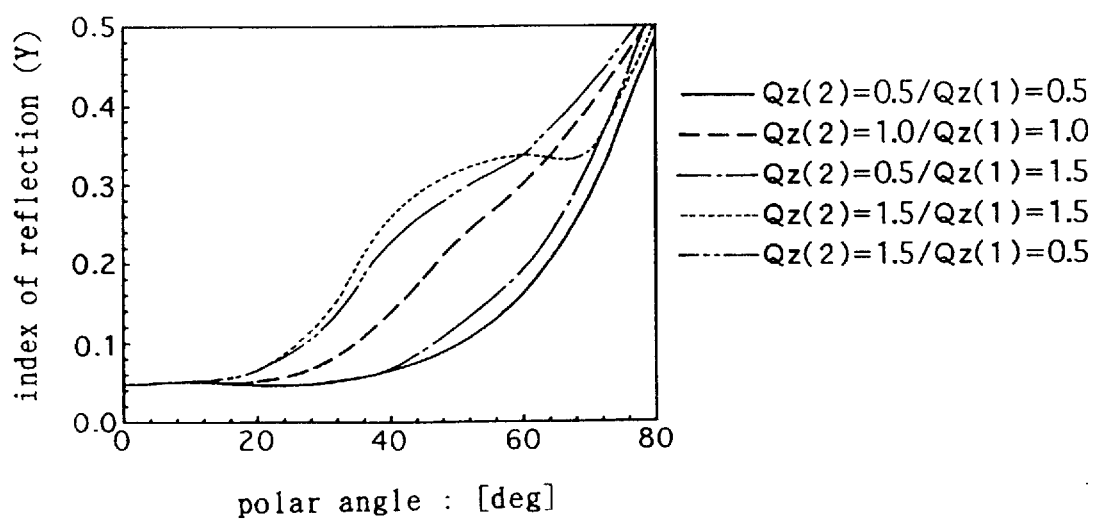
FIG. 6(b) shows the change of the reflectance of black when an off-voltage is applied with respect to the change of visual angle in the upper direction for a reflective liquid crystal display device in a ninth embodiment of the present invention.

FIG. 6(b) shows the change of the reflectance of black when an off-voltage is applied with respect to the change of visual angle in the upper direction of a reflective liquid crystal display device.

In the present embodiment, the values of the reflective liquid crystal display device are set as follows.
$\Delta n_{LC} \cdot d_{LC} = 0.910$ μm, $R_{Film}(1) = 0.560$ μm, $R_{Film}(2) = 0.460$ μm, $\phi_{LC0} = -35°$, $\phi_{LC} = 35°$, $\Omega_{LC} = 250°$, $\phi_{F1} = 125°$, $\phi_{F2} = 80°$ and $\phi_P = 145°$.

Under the above-mentioned condition, when the Z coefficients of the polymer films 31b and 31a, Qz(1) and Qz(2) are changed from 0.0 to 1.5 respectively, the change of visual angle characteristics was measured.

As shown in FIGS. 6(a) and 6(b), it was confirmed that a polymer film 31a positioned closer to the polarization film 30 had a great effect on the change of the visual angle characteristic, thereby obtaining the excellent reflectance characteristics of black with low visual angle dependency when Qz(2) was small. Further, it was confirmed that the more excellent reflectance of black with low visual angle dependency was able to be obtained by the reflective liquid crystal display device having the smaller value of Qz(1) when Qz(2) was constant.

Further, more details of the characteristics were measured. It was confirmed that a reflective liquid crystal display device with low visual angle dependency was obtained when Qz(2) was in the range of 0.0 to 1.0. In particular, it was confirmed that more excellent visual angle characteristics are obtained. when Qz(2) was in the range of 0.3 to 0.7. Further, it was confirmed that it was further preferable that Qz(1) was in the range of 0.3 to 0.7.

(A Tenth Embodiment)

Figure 7:
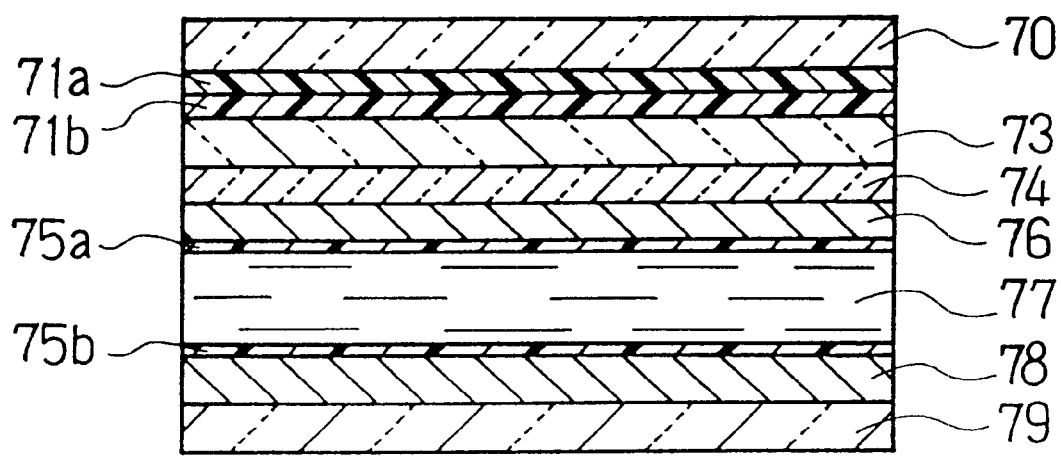
FIG. 7 is a sectional view showing a reflective liquid crystal display device in a tenth embodiment of the present invention

FIG. 7 is a sectional view showing a reflective liquid crystal display device of a tenth embodiment of the present invention. As shown in FIG. 7, a transparent electrode 76 is provided via a color filter layer 74 on a transparent substrate 73 positioned at the upper side of the display device. A diffusion metallic reflective electrode 78 is provided on a substrate 79 positioned at the lower side of the device. An alignment layer 75a is provided on the transparent electrode 76, and an alignment layer 75b is provided on the diffusion metallic reflective electrode 78 respectively. The transparent substrate 73 positioned at the upper side and the substrate 79 positioned at the lower side are arranged parallel to each other with the alignment layers 75a and 75b facing each other. A liquid crystal layer 77 is provided between the alignment layers 75a and 75b. Polymer films 71b and 71a are provided in that sequential order on a surface of the transparent substrate 73 positioned at the upper side opposite to the surface where the transparent electrode 76 is provided. A polarization film 70 is provided on the polymer film 71a.

A view illustrating the optical characteristics of the reflective liquid crystal display device is the same as that of the third embodiment (refer to FIG. 4).

Next, a method for manufacturing the reflective liquid crystal display device having the above-mentioned constitution will be described.

A glass substrate was used as the transparent substrate 73 positioned at the upper side and the substrate 79 positioned at the lower side. Pigment dispersion color filter layer 74 with stripe-array of red, green and blue was provided on the transparent substrate 73 positioned at the upper side by photolithography. A transparent electrode 76 composed of oxide of indium and tin as a picture element electrode was provided on the surface of the color filter 74.

A diffusion reflective metallic reflective electrode 78 was provided on the substrate 79 positioned at the lower side by depositing titanium film having a thickness of 300 nm and silver film having a thickness of 200 nm in that sequential order and then roughening the surface of the substrate 79 positioned at the lower side by irradiating with YAG laser.

5 wt % polyimide solution (the solvent is N-methyl-2-pyrrolidine) was printed on a transparent electrode 76 and a diffusion metallic reflective electrode 78. Then the polyimide solution was hardened at 200° C. and alignment treatment was carried out by the rotation rubbing method using rayon cloth to obtain a predetermined twist angle. Accordingly, alignment layers 75a and 75b were provided on the transparent electrode 76 and the diffusion metallic reflective electrode 78 respectively.

Next, a thermo-setting seal resin containing 1.0 wt % of glass fiber having a predetermined diameter was printed on the periphery of the top surface of the transparent substrate 73 positioned at the upper side and resin beads having a predetermined diameter were spread on the substrate 79 positioned at the lower side at a ratio of 200 pieces/mm². The transparent substrate 73 positioned at the upper side and the substrate 79 positioned at the lower side were adhered together, and then the thermo-setting seal resin was hardened at 150° C. to manufacture a cell container. In this case, the cell container has a filling portion for filling liquid crystal material. Next, air in the cell container is evacuated while the liquid crystal material is deaerated. The liquid crystal, which is obtained by mixing a predetermined quantity of chiral liquid crystal with ester-based nematic liquid crystal having a birefringence $\Delta n_{LC}$=0.13, was filled in the cell container. Then, the filling portion of the cell container was sealed with ultraviolet ray hardening resin, and the ultraviolet ray hardening resin was hardened by irradiation with ultraviolet ray to manufacture a liquid crystal cell Next, polycarbonate was adhered to the surface of the transparent substrate 73 positioned opposite to the surface where the transparent electrode 76 was provided as polymer films 71b and 71a so that $\phi_{F1}$ and $\phi_{F2}$ have a predetermined angle respectively.

Finally, a neutral gray polarization film, to which antiglare (AG) treatment was applied, was adhered to the polymer film 71a as a polarization film 70 so as that $\phi_P$ has a predetermined angle. According to the above-mentioned steps, a reflective liquid crystal display device was manufactured.

In the present embodiment, the values of the reflective liquid crystal display device are set as follows.
$\Delta n_{LC} \cdot d_{LC}$=0.910 μm, $R_{Film}(1)$=0.560 μm, $R_{Film}(2)$=0.460 μm, $\phi_{LC0}$=−35°, $\phi_{LC}$=35°, $\Omega_{LC}$=250°, $\phi_{F1}$=125°, $\phi_{F2}$=80° and $\phi_P$=140°.

It was confirmed that a reflective liquid crystal display device having the natural change of visual angle characteristic can be obtained by using diffusion reflective metallic reflective electrode 78 instead of a scattering film.

The characteristics of the front surface of the reflective liquid crystal display device were measured. The contrast was 7.0 and the reflectance with Y value conversion of white was 13.8%.

Further, a reflective liquid crystal display device with black and white mode was manufactured by removing the color filter layer 34 and the characteristics of the front surface were measured. The contrast was 7.1 and the reflectance with Y value conversion of white was 29.8%.

Further, in the present embodiment, a metallic reflective electrode comprising silver and having a surface roughened by irradiating with YAG laser was used. However, it is not limited thereto. For example, when using a metallic reflective electrode to whose surface a lot of particles of silicon are spread and diffusion effect is applied, the same effect can be obtained.

(A Eleventh Embodiment)

Figure 8:
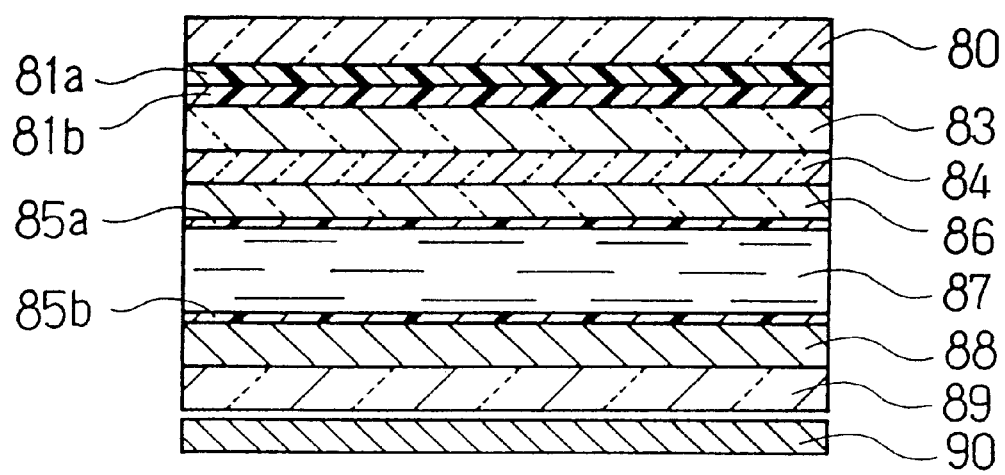
FIG. 8 is a sectional view showing a reflective liquid crystal display device in an eleventh embodiment of the present invention.

FIG. 8 is a sectional view showing a reflective liquid crystal display device of an eleventh embodiment of the present invention. As shown in FIG. 8, a transparent electrode 86 is provided via a color filter layer 84 on a transparent substrate 83 positioned at the upper side of the display device. A transparent electrode 88 is provided on a substrate 89 positioned at the lower side of the device. An alignment layer 85a is provided on the transparent electrode 86, and an alignment layer 85b is provided on the transparent electrode 88 respectively. The transparent substrate 83 positioned at the upper side and the transparent substrate 89 positioned at the lower side are arranged parallel to each other with the alignment layers 85a and 85b facing each other. A liquid crystal layer 87 is provided between the alignment layers 85a and 85b. Polymer films 81b and 81a are provided in that sequential order on a surface of the transparent substrate 83 positioned at the upper side opposite to the surface where the transparent electrode 86 is provided. A polarization film 80 is provided on the polymer film 81a. Further, a diffusion reflector 90 is provided under the transparent substrate 89 positioned at the lower side.

A view illustrating the optical characteristics of the reflective liquid crystal display device is the same as that of the third embodiment (refer to FIG. 4).

Next, a method for manufacturing the reflective liquid crystal display device having the above-mentioned construction will be described.

A glass substrate was used as the transparent substrate 83 positioned at the upper side and the transparent substrate 89 positioned at the lower side. Pigment dispersion color filter layer 84 with stripe-array of red, green and blue was provided on the transparent substrate 83 by photolithography. Transparent electrodes 86 and 88 composed of oxide of indium and tin as a picture element electrode were provided on the surface of the color filter 84 and the transparent substrate 89 positioned at the lower side.

5wt % polyimide solution (the solvent is N-methyl-2-pyrrolidine) was printed on transparent electrodes 86 and 88. Then the polyimide solution was hardened at 200° C. and an alignment treatment was carried out by the rotation rubbing method using rayon cloth to obtain a predetermined twist angle. Accordingly, alignment layers 85a and 85b were provided on the transparent electrodes 86 and 88 respectively.

Next, a thermo-setting seal resin containing 1.0 wt % of glass fiber having a predetermined diameter was printed on the periphery of the top surface of the transparent substrate 83 positioned at the upper side and resin beads having a predetermined diameter were spread on the substrate 89 positioned at the lower side at a ratio of 200 pieces/mm². The transparent substrate 83 positioned at the upper side and the substrate 89 positioned at the lower side were adhered together, and then the thermosetting seal resin was hardened at 150° C. to manufacture a cell container. In this case, the cell container has a filling portion for filling liquid crystal material. Next, air in the cell container is evacuated while the liquid crystal material is deaerated. The liquid crystal which is obtained by mixing a predetermined quantity of chiral liquid crystal with ester-based nematic liquid crystal having a birefringence $\Delta n_{LC}$=0.13, was filled in the cell container. Then, the filling portion of the cell container was sealed with ultraviolet ray hardening resin, and the ultraviolet ray hardening resin was hardened by irradiation with ultraviolet ray to manufacture a liquid crystal cell Next, a polycarbonate was adhered to the surface of the transparent substrate 83 positioned at the upper side opposite to the surface where the transparent electrode 86 was provided as polymer films 81b and 81a so as that $\phi_{F1}$ and $\phi_{F2}$ have a predetermined angle respectively.

Next, a neutral gray polarization film, to which anti-glare (AG) treatment was applied, was adhered to the polymer film 81b as a polarization film 80 so that $\phi_P$ has a predetermined angle.

Finally, a diffusion reflector made of silver was provided under the transparent substrate 89 positioned at the lower side as a diffusion reflector 90.

According to the above-mentioned steps, a reflective liquid crystal display device was manufactured.

In the present embodiment, the values of the reflective liquid crystal display device are set as follows.
$\Delta n_{LC} \cdot d_{LC}$=0.910 μm, $\phi_{LC0}$=−35°, $\phi_{LC}$=35°, $\Omega_{LC}$=250°, $\phi_{F1}$=125°, $\phi_{F2}$=80° and $\phi_P$=140°.

It was confirmed that a reflective liquid crystal display device having the natural change of visual angle characteristic was obtained though some image blur was caused by the parallax of the panel when transparent substrates and transparent electrodes were used as those positioned at the upper side and at the lower side, and a diffusion reflector was provided at the lower side.

The characteristics of the front surface of the reflective liquid crystal display device were measured. The contrast was 6.8 and the reflectance with Y value conversion of white was 13.0%.

Further, a reflective liquid crystal display device with black and white mode was manufactured by removing the color filter layer 34 and the characteristics of the front surface were measured. The contrast was 6.9 and the reflectance with Y value conversion of white was 28.2%.

Furthermore, it was confirmed that when a diffusion reflector 90 is provided on a transparent substrate 89 positioned at the lower side via an air layer, instead of being bonded to the surface of the transparent substrate 89 completely with adhesive, a reflective liquid crystal display device having a more natural change of visual angle characteristic due to the diffusion effect caused by the difference between the index of refraction of resin, 1.6, and that of air, 1.0, can be obtained.

Further, in the present embodiment, a diffusion reflector made of silver was used as a diffusion reflector 90. However, it was not limited to. For example, when a diffusion reflector made of aluminum is used, the same effect can be obtained.

This invention may be embodied in other specific forms without departing from the spirit or essential characteristics thereof The embodiments disclosed in this application are to be considered in all respects as illustrative and not restrictive, the scope of the invention being indicated by the appended claims rather than by the foregoing description, an all change which come within the meaning and range of equivalency of the claims are intended to be embraced therein.

What is claimed is:

1. A reflective liquid crystal display device comprising:
    a first transparent substrate having an outer side and an inner side, a transparent electrode and an alignment layer being provided on the inner side of the first substrate in that sequential order;
    a second substrate having an outer side and an inner side, a metallic reflective electrode and an alignment layer being provided on the inner side of the second substrate in that sequential order;
    a liquid crystal cell, in which nematic liquid crystal as a liquid crystal layer is filled, provided between the alignment layers of said first and second substrates;
    two polymer films provided outside of said first transparent substrate;
    and a polarization film provided outside of said polymer films;
    wherein the twist angle of said nematic liquid crystal is selected between 220° and 260°, the product of the birefringence of said nematic liquid crystal $\Delta n_{LC}$ and the thickness of said liquid crystal layer $d_{LC}$, $\Delta n_{LC} \cdot d_{LC}$ is set to be between 0.6 $\mu$m and 1.2 $\mu$m; a birefringence difference is between −0.1 $\mu$m and −0.2 $\mu$m as determined by $\Delta(R)=(R_{Film}(1)+R_{Film}(2))-\Delta n_{LC} \cdot d_{LC}$ which is defined by using the retardation of said polymer film, designated as $R_{Film}(i)=(n_x(i)-n_y(i)) \cdot d_{Film}(i)$ (i=1,2) in which 1 indicates the one of the two polymer films positioned closer to said liquid crystal cell, 2 indicates the other of the two polymer films, $n_x(i)$ (i=1,2) indicates an extraordinary index of refraction of the inside of each polymer film, $n_y(i)$ (i=1,2) indicates an ordinary index of refraction of the inside of each polymer film, $d_{Film}(i)$ (i=1,2) indicates a thickness of each polymer film and $\Delta n_{LC} \cdot d_{LC}$; $\phi_{F1}-\phi_{LC}$ satisfies 90°±20°, $\phi_{F2}-\phi_{F1}$ satisfies 45°±20° and $\phi_P-\phi_{F2}$ satisfies −45°±20°, wherein when the reflective liquid crystal display device is seen from the side of said first transparent substrate, the twist direction of the liquid crystal is designated as the positive direction of rotation, an angle is measured using the horizontal direction as a standard, $\phi_{LC}$ designates the angle of the alignment direction of the liquid crystal molecule on said transparent substrate positioned at the upper side, $\phi_{F1}$ indicates the angle of the direction of retardation axis of the polymer film positioned at the side of said liquid crystal cell, $\phi_{F2}$ indicates the angle of the direction of retardation axis of the polymer film positioned at the side of said polarization film, and $\phi_P$ indicates the angle of the direction of the adsorption axis of the polarization film.

2. The reflective liquid crystal display device as claimed in claim 1, wherein the twist angle of said nematic liquid crystal is selected between 240° and 260°, and $\Delta n_{LC} \cdot d_{LC}$ is set to be between 0.8 $\mu$m and 1.1 $\mu$m.

3. The reflective liquid crystal display device as claimed in claim 1, wherein $R_{Film}(1)$ is 0.3 $\mu$m ±0.1 $\mu$m and $R_{Film}(2)$ is 0.5 $\mu$m ±0.1 $\mu$m.

4. The reflective liquid crystal display device as claimed in claim 1, wherein a polymer film selected from the group consisting of polycarbonate, polyalylate and polysulfane is used for the polymer film.

5. The reflective liquid crystal display device as claimed in claim 1, wherein, the Z coefficient is obtained by the formula $Q_Z(i)=(n_x(i)-n_Z(i))/(n_x(i)-n_y(i))$ which is defined by using an extraordinary index of refraction of the inside of each polymer film, $n_x(i)$ (i=1,2), an ordinary index of refraction of the inside of each polymer film, $n_y(i)$ (i=1,2) and an index of refraction of the perpendicular direction to surface of each polymer film, $n_Z(i)$ (i=1,2), in which 1 indicates the one of the two polymer films positioned closer to said liquid crystal cell and 2 indicates the other of the two polymer films, and Qz(2), is between 0.0 and 1.0.

6. The reflective liquid crystal display device as claimed in claim 5, wherein $Q_Z(2)$ is between 0.3 and 0.7.

7. The reflective liquid crystal display device as claimed in claim 5, wherein $Q_Z(1)$ is between 0.3 and 0.7.

8. The reflective liquid crystal display device as claimed in claim 1, wherein said metallic reflective electrode comprises aluminum or silver and is of a specular reflection type.

9. The reflective liquid crystal display device as claimed in claim 1, wherein at least one scattering film is provided between said one of the polymer films and said liquid crystal cell.

10. The reflective liquid crystal display device as claimed in claim 9, wherein said scattering film is a forward scattering film.

11. The reflective liquid crystal display device as claimed in claim 10, wherein a scattering range of said forward scattering film is asymmetric with respect to the normal direction of the film.

12. The reflective liquid crystal display device as claimed in claim 11, wherein a plurality of layered forward scattering films are used and a projection direction of a bisector direction of the angle indicating the scattering range of each forward scattering film to the surface of the film is different.

13. The reflective liquid crystal display device as claimed in claim 11, wherein two, three or four forward scattering films, which are layered, are used and projections direction of bisector directions of the angles indicating the scattering range of each forward scattering film to the surface of the film are at a right angle or anti-parallel to each other.

14. The reflective liquid crystal display device as claimed in claim 1, wherein at least one scattering film is provided between said the polarization film and said other of the two polymer films.

15. The reflective liquid crystal display device as claimed in claim 14, wherein said scattering film is a forward scattering film.

16. The reflective liquid crystal display device as claimed in claim 15, wherein a scattering range of said forward scattering film is asymmetric with respect to the normal direction of the film.

17. The reflective liquid crystal display device as claimed in claim 16, wherein a plurality of layered forward scattering films are used and a projection direction of a bisector direction of the angle indicating the scattering range of each forward scattering film to the surface of the film is different.

18. The reflective liquid crystal display device as claimed in claim 16, wherein two, three or four forward scattering films, which are layered, are used and projections direction of bisector directions of the angles indicating the scattering range of each forward scattering film to the surface of the film are at a right angle or anti-parallel to each other.

19. The reflective liquid crystal display device as claimed in claim 1, wherein the metallic reflective electrode is a diffusion reflective type or one having a scattering film layered on a specular metallic reflective electrode.

20. The reflective liquid crystal display device as claimed in claim 1, wherein a transparent substrate is used as the second substrate positioned at the lower side, a transparent electrode is provided on said substrate positioned at the lower side instead of metallic reflective electrode and a diffusion reflector comprising aluminum or silver is provided on the outside of said second substrate provided at the lower side.

21. The reflective crystal display device as claimed in claim 20, wherein air is present between said diffusion reflector and said liquid crystal cell.

22. The reflective liquid crystal display device as claimed in claim 1, wherein a color filter layer is provided between said first transparent substrate and said transparent electrode.

* * * * *